US010386493B2

(12) United States Patent
Irish et al.

(10) Patent No.: US 10,386,493 B2
(45) Date of Patent: Aug. 20, 2019

(54) SYSTEM AND METHOD FOR LOCALIZATION AND TRACKING

(71) Applicant: The Regents of the University of California, Oakland, CA (US)

(72) Inventors: Andrew Irish, Santa Barbara, CA (US); Upamanyu Madhow, Santa Barbara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 252 days.

(21) Appl. No.: 15/281,997

(22) Filed: Sep. 30, 2016

(65) Prior Publication Data

US 2017/0299727 A1 Oct. 19, 2017

Related U.S. Application Data

(60) Provisional application No. 62/284,450, filed on Oct. 1, 2015.

(51) Int. Cl.
*G01S 19/42* (2010.01)
*G01S 19/22* (2010.01)

(52) U.S. Cl.
CPC .............. *G01S 19/22* (2013.01); *G01S 19/42* (2013.01); *G01S 19/428* (2013.01)

(58) Field of Classification Search
CPC ........ G01S 19/22; G01S 19/42; G01S 19/428; G01S 19/28; G01S 19/09; G01S 19/24; G01S 5/0027
USPC .................................................... 342/357.25
See application file for complete search history.

(56) References Cited

U.S. PATENT DOCUMENTS

| 4,949,268 A | 8/1990 | Nishikawa |
| 6,900,758 B1 | 5/2005 | Mann et al. |
| 2004/0190637 A1* | 9/2004 | Maltsev .............. H04L 27/2657 375/260 |

(Continued)

FOREIGN PATENT DOCUMENTS

| WO | 2015126499 | 8/2015 |
| WO | 20150126499 A | 8/2015 |

OTHER PUBLICATIONS

Abdi, et al., "A New Simple Model for Land Mobile Satellite Channels: First- and Second-Order Statistics", IEEE Transactions on Wireless Communications, vol. 2, No. 3, 519-528, May 2003.

(Continued)

*Primary Examiner* — Harry K Liu
(74) *Attorney, Agent, or Firm* — Billion & Amritage; Michael A. Collins

(57) ABSTRACT

A method of determining location of a user device includes receiving global navigation satellite system (GNSS) fix data that represents GNSS calculated position of the user device, receiving signal strength data associated with each satellite communicating with the user device, and receiving satellite data regarding locations of satellites. The method further includes retrieving satellite blocking values from a cache that describe a likelihood of a satellite signal being blocked at a plurality of possible locations. A non-linear filter, implemented by one or more processors, is applied to the GNSS fix data, signal strength data, and satellite blocking values to generate an updated position estimate of the user device.

20 Claims, 7 Drawing Sheets

(56) References Cited

U.S. PATENT DOCUMENTS

| | | | |
|---|---|---|---|
| 2005/0232338 A1* | 10/2005 | Ziedan | G01S 19/243 375/145 |
| 2005/0234679 A1 | 10/2005 | Karlsson | |
| 2006/0106533 A1* | 5/2006 | Hirokawa | G01C 21/165 701/472 |
| 2008/0033645 A1 | 2/2008 | Levinson | |
| 2008/0232434 A1* | 9/2008 | Yang | H04B 1/7093 375/140 |
| 2010/0194634 A1* | 8/2010 | Biacs | G01S 19/23 342/357.31 |
| 2011/0102545 A1 | 5/2011 | Krishnaswamy et al. | |
| 2011/0153198 A1 | 6/2011 | Kokkas | |
| 2012/0035437 A1 | 2/2012 | Ferren | |
| 2012/0044104 A1 | 2/2012 | Schloetzer | |
| 2012/0159408 A1 | 6/2012 | Hershey et al. | |
| 2012/0245844 A1 | 9/2012 | Lommel et al. | |
| 2012/0249368 A1 | 10/2012 | Youssef et al. | |
| 2012/0289243 A1 | 11/2012 | Tarlow et al. | |
| 2013/0080045 A1 | 3/2013 | Ma et al. | |
| 2013/0131985 A1 | 5/2013 | Weiland | |
| 2013/0278466 A1* | 10/2013 | Owen | G01S 1/02 342/464 |
| 2013/0285849 A1 | 10/2013 | Ben-Moshe et al. | |
| 2013/0332065 A1 | 12/2013 | Hakim | |
| 2014/0015529 A1 | 1/2014 | Bottomley | |
| 2014/0062777 A1* | 3/2014 | MacGougan | G01S 19/26 342/357.43 |
| 2015/0031390 A1 | 1/2015 | Robertson | |
| 2015/0039154 A1* | 2/2015 | Bhardwaj | G01S 19/49 701/1 |
| 2015/0086084 A1 | 3/2015 | Falconer | |
| 2015/0309183 A1* | 10/2015 | Black | G01S 19/258 342/357.25 |
| 2015/0319729 A1 | 11/2015 | Macgougan | |
| 2016/0062949 A1* | 3/2016 | Smith | H04W 4/02 702/150 |
| 2016/0290805 A1 | 10/2016 | Irish et al. | |

OTHER PUBLICATIONS

Abdi, et al., "On the Estimation of the K Parameter for the Rice Fading Distribution", IEEE Communications Letters, vol. 5, No. 3, 92-94 Mar. 2001.

Arulampalam, et al., "A Tutorial on Particle Filters for Online Nonlinear/Non-Gaussian Bayesian Tracking", IEEE Transactions on Signal Processing, vol. 50, No. 2, 174-188, Feb. 2002.

Ben-Moshe, et al., "Improving Accuracy of GNSS Devices in Urban Canyons", CCCG 2011, Toronto ON, Aug. 10{12, 2011.

Bryson, et al., Estimation using sampled data containing sequentially correlated noise. Journal of Spacecraft and Rockets, 5(6):662-665, 1968.

Groves, "Shadow Matching: A New GNSS Positioning Technique for Urban Canyons", The Journal of Navigation (2011), 64, 417-430.

Hsu, "NLOS Correction/Exclusion for GNSS Measurement Using RAIM and City Building Models", Sensors 2015, 15, Jul. 17, 2015, 17329-17349.

Ihler, et al., Efficient multiscale sampling from products of Gaussian mixtures. Advances in Neural Information Processing Systems, 16:1-8, 2004.

Isaacs, et al., "Bayesian Localization and Mapping Using GNSS SNR Measurements", Jul. 10, 2014, 445-451.

Kaplan, et al., Understanding GPS: Principles and Applications. Artech House, second edition, 2005, 322-329.

Kim, et al., Localization and 3D reconstruction of urban scenes using GPS. In Proc. of IEEE International Symposium on Wearable Computers., pp. 11-14, 2008.

Li, et al., Survey of maneuvering target tracking. part i. dynamic models. IEEE Trans. on Aerospace and Electronic Systems, 39(4): 1333-1364, 2003.

Loo, A statistical model for a land mobile satellite link. IEEE Trans. on Vehicular Technology, 34(3):122-127, 1985.

Petersen, et al., The matrix cookbook. Technical University of Denmark, 7:15, 2008.

Peyraud, et al., "About Non-Line-of-Sight Satellite Detection and Exclusion in a 3D Map-Aided Localization Algorithm", Sensors 2013, 13, Jan. 11, 2013, 829-847.

L Wang, 'Kinematic GNSS Shadow Matching Using Particle Filters', In: Proceedings of the 27th International Technical Meeting of the Satellite Division of the Institute of Navigation (ION GNSS+ 2014), 2014, Tampa, Florida, pp. 1907-1919.

International Search Report and Written Opinion issued in PCT Application No. PCT/US2016/042588, dated Apr. 13, 2017, 15 pages.

"International Search Report and Written Opinion", PCT/US2014/ 068220, dated Aug. 21, 2015.

Sequra, et al., "Ultra Wide-Band Localization and SLAM: a Comparative Study for Mobile Robot Navigation", Sensors MDPI, Feb. 10, 2011, 2035-2055.

"EP Partial Search Report for 16852235.7-1206 / 3326005 PCT/ US2016042588, dated Feb. 13, 2019".

Yozevitch, et al., "A robust shadow matching algorithm for GNSS Positioning", Navigation: Journal of the Institute of Navigation, Institute of Navigation, Fairfax, VA, US, vol. 62, No. 2, Jun. 1, 2015, 95-101.

Issacs, et al., "Bayesian localization and mapping using GNSS SNR measurements", 2014 IEEE/ION Position, Location and Navigation Symposium—Plans 2014, IEEE,, May 5, 2014, 445-451.

Saunders, et al., "A physical-statistical model for land mobile satellite propagation in built-up areas", 10th International Conference on Antennas and Propagation, Conference Ppublication No. 436, IEE 1997, Apr. 14-17, 1997.

Office Action for U.S. Appl. No. 15/211,808, dated Feb. 4, 2019.

* cited by examiner

SYSTEM AND METHOD FOR LOCALIZATION AND TRACKING

CROSS-REFERENCE TO RELATED APPLICATIONS

This application claims priority to U.S. Provisional Application No. 62/284,450, filed on Oct. 1, 2015, and entitled "CLOUD INFRASTRUCTURE FOR 3D MAPS", the disclosure of which is incorporated by reference in its entirety.

STATEMENT OF GOVERNMENT RIGHTS

This invention was made with Government support under Grant (or Award) No. W911NF-09-0001 awarded by the U.S. Army Research Office Agency. The Government has certain rights in this invention.

TECHNICAL FIELD

This invention relates generally to location estimation using global navigation satellite systems (GNSS), and in particular to location estimation within built-up environments.

BACKGROUND

Global Navigation Satellite Systems (GNSS) consist of constellations of satellites, wherein each satellite broadcasts signals containing information so that corresponding earth-based receivers that receive the signal can identify the satellite that generated the signal. Based on time of arrival measurements (alternatively expressed as pseudoranges by multiplying by the speed of light) for signals from at least 4 satellites, a GNSS receiver estimates its three-dimensional (3D) location and timing offset from the highly accurate clocks used by the satellites. This is a simple generalization of the concept of trilateration, and a key assumption is that the path from each satellite to the receiver is line of sight (LOS). However, GNSS localization quality is often degraded. This degradation is especially prevalent in urban areas, where the presence of tall buildings generates reflections of the received signals. Because the GNSS location estimate is based, at least in part, on how long it takes the signal to reach the device (i.e., so called "time of flight" measurements), reflections prove especially problematic in determining the GNSS position fix as the time-of-flight, and hence the pseudorange, will increase as a result of the reflection. These errors in pseudorange often lead to large errors in localization, for example, up to 50 meters in high-rise urban environments. Even if the LOS path is available, the pseudorange may be corrupted by the presence of additional reflected paths.

Inaccuracies in GNSS in urban environments have a significant adverse impact in a large, and growing, number of settings. In addition to its traditional applications in transportation logistics, the use of GNSS has become ubiquitous with the advent of consumer mobile electronic devices. GNSS-based localization is relied upon by individual users for both pedestrian and vehicular navigation. Accurate global localization using GNSS also forms the basis for a variety of enterprises such as car services and delivery services. It is also a critical component in vehicular automation technology, with global location using GNSS providing an anchor for fine-grained localization and tracking using vehicular sensors and actuators.

A GNSS receiver has information about the signal-to-noise ratio (SNR) of each satellite it sees, which can be often be obtained via a convenient software interface. These SNRs, employed together with information about the propagation environment, can provide valuable information about location that supplements the standard GNSS position fix. In GNSS and other wireless communication, line-of-sight (LOS) channels are characterized by statistically higher received power levels than those in which the LOS signal component is blocked (e.g., non-LOS or NLOS channels). As a mobile GNSS receiver traverses an area, obstacles (e.g., buildings, trees, terrain) frequently block the LOS component of different satellite signals, resulting in NLOS channels characterized by statistically lower signal-to-noise ratios (SNR). While the NLOS channels cannot be relied upon to determine the position fix of the user device, the decrease in SNR does provide information regarding the location of the device; namely, that the device is within the shadow of a building/infrastructure. Thus, the satellite SNRs yield probabilistic information regarding the receiver's location: higher SNR indicates that the path from the receiver to the satellite is likely LOS, while lower SNR indicates that the path from the receiver to the satellite is likely NLOS. Having knowledge of the layout/map of the urban environment, the satellite SNR signal can be utilized to determine possible locations for the user device based on calculation of positions that would likely be "blocked" or in the shadow of various buildings or structures. Such procedures for extracting location information from satellite SNRs is termed "shadow matching."

While shadow matching using satellite SNRs provides valuable location information that can improve the standard GNSS location estimate, the information from shadow matching is noisy, and inherently probabilistic. Specifically, high SNR could be obtained for NLOS paths due to strong reflections, while low SNR could be obtained for LOS paths due to multipath interference. Thus, deterministic shadow matching does not work in complex propagation environments.

It would therefore be beneficial to develop a robust, computationally efficient approach for utilizing shadow matching for localization and tracking, in a manner that accounts for modeling uncertainties and measurement noise.

BRIEF SUMMARY OF THE INVENTION

In one embodiment, a localization system is comprised of a cache and a non-linear filter. The cache stores values indicative of a likelihood of a satellite signal being blocked at a plurality of possible locations. The non-linear filter receives as inputs from a user device a position estimate and a measured signal strength data associated with a plurality of satellites utilized to generate an improve position estimate. The non-linear filter utilizes a signal-to-noise ratio (SNR) model to determine the likelihood of a particle being located at a particular position given the observed signal strength from each of the plurality of satellites and satellite blocking probabilities fetched from the cache.

In another exemplary embodiment, a method of determining location of a user device includes receiving global navigation satellite system (GNSS) fix data that represents GNSS calculated position of the user device. The method further includes receiving signal strength data associated with each satellite communicating with the user device and receiving satellite data regarding locations of satellites. Values describing a likelihood of a satellite signal being blocked are retrieved from a cache. A non-linear filter is applied to the GNSS fix data, signal strength data, and shadow matching data to generate an updated position estimate of the user device, wherein the non-linear filter includes, at least in part, an SNR measurement model that assigns weights to each of the plurality of particles representing possible user device locations included in a particle set based on the retrieved satellite blocking probabilities retrieved from the cache and the received signal strength data.

In another exemplary embodiment, a method of determining location of a user device includes receiving global navigation satellite system (GNSS) fix data that represents GNSS calculated position of the user device. The method further includes receiving signal strength data associated with each satellite communicating with the user device and receiving satellite data regarding locations of satellites. A non-linear filter is applied to the GNSS fix data and signal strength data to generate an updated position estimate of the user device, wherein the non-linear filter utilizes a signal-to-noise ratio (SNR) model that assigns weights to each of the plurality of particles representing possible user device locations included in a particle set based on calculated likelihoods of satellite signals being blocked at each of the plurality of particles and the received signal strength data, wherein the SNR model utilizes first order reflections to further refine the likelihood of a particle being located at a particular position.

DETAILED DESCRIPTION

Example embodiments disclosed herein can provide systems and methods of providing position estimates of global navigation satellite systems (GNSS) using probabilistic shadow matching. Example methods described herein are particularly significant in urban areas where GNSS position fixes could become inaccurate due to LOS blockage and multipath propagation.

The localization and tracking algorithms disclosed herein employ the following information: the locations of the satellites, the GNSS receiver's location estimate and associated estimated uncertainty, the SNRs of the satellites, and information regarding the 3D environment surrounding the receiver. Information regarding the 3D environment may be utilized in a pre-processing operation to build a shadow matching cache that describes the likelihood of a signal between a particular location and a satellite being blocked. The shadow matching cache can be accessed during the localization and tracking algorithms to determine the likelihood of a signal being blocked without having to calculate or ray trace each particle/satellite pairing.

A Bayesian framework is employed in an example embodiment to fuse the GNSS location fixes and satellite SNRs for localization and tracking. Specifically, the raw GNSS location estimates and the SNRs constitute the measurements driving a nonlinear filter. Example nonlinear filtering algorithms disclosed here fall under the general framework of particle filtering, where importance sampling is included in each filtering step. In particular, the GNSS system describes a modified particle filter that provides a mechanism for selecting particles to include in the analysis set.

Figure 1:
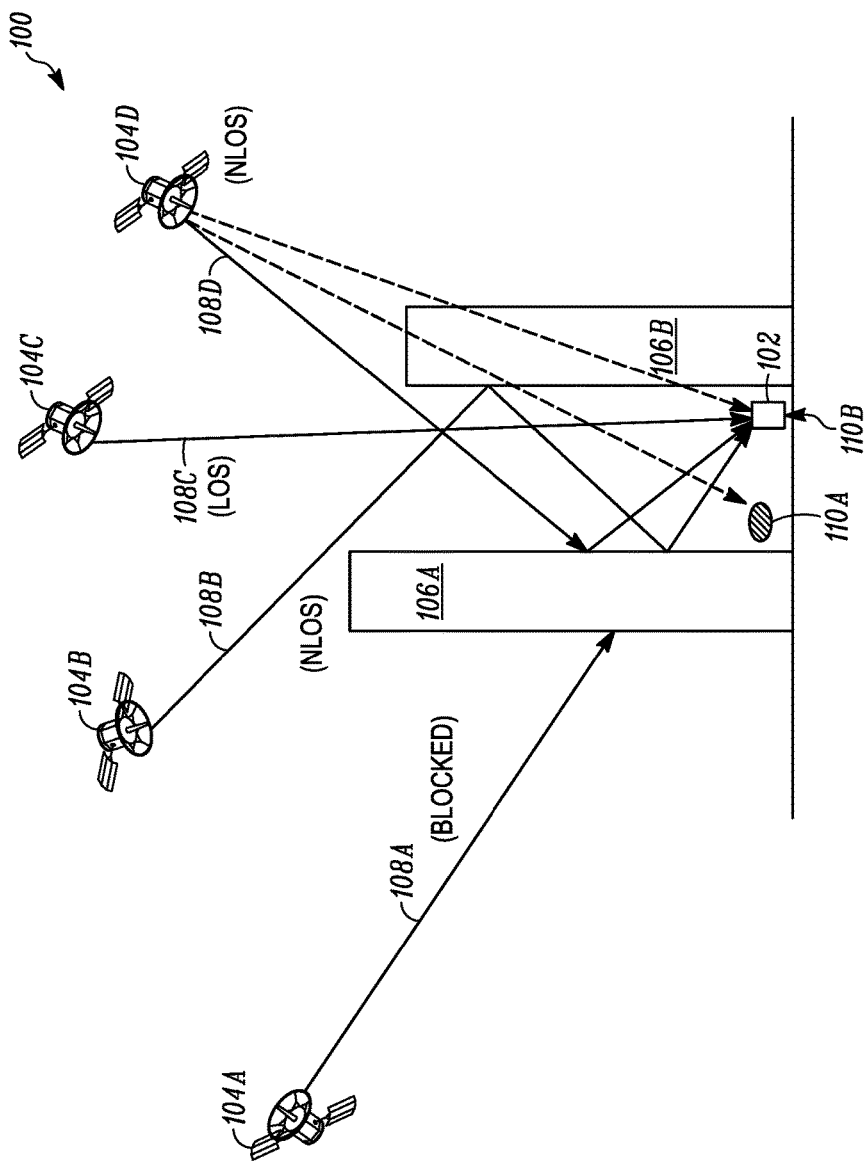
FIG. 1 is a schematic diagram of a localization and tracking system according to various embodiments.

FIG. 1 is a schematic diagram of a localization and tracking system 100 according to various embodiments. In particular, FIG. 1 illustrates the different types of GNSS signals that may be received by the mobile device. In the embodiment shown in FIG. 1, system 100 includes mobile device 102, satellites 104a, 104b, 104c, and 104d, and buildings/obstacles 104a and 104b. In the embodiment shown in FIG. 1, mobile device 102 is a device capable of receiving GNSS data from one or more of the plurality of satellites. In addition, mobile device 102 is capable of determining an attribute of each of the GNSS signals provided by the plurality of satellites 104a, 104b, 104c, and 104d. The determination can be made in a number of ways, such as accessing data indicative of the attribute or by measuring the corresponding GNSS signal or other signals. For example, in one embodiment, mobile device 102 monitors the signal-to-noise ratio (SNR) of the received GNSS data.

For the purpose of describing the operation, four satellites are shown at various locations relative to mobile device 102 to illustrate the various types of signal paths between satellites and mobile devices. During operation, the mobile device 102 typically communicates with a number of available satellites. Although a smartphone is the most commonly utilized device capable of interfacing with satellites 104 as part of a GNSS, other types of mobile devices such as tablets, watches, etc., as well as navigation units in automobiles, may be utilized.

In one embodiment, processing of the monitored GNSS data and SNR data is performed locally by mobile device 102. However, in other embodiments mobile device 102 communicates the received GNSS data and SNR data to a cloud-based localization server (shown in FIG. 2), which analyzes the data and returns a localization estimate to mobile device 102.

During operation, e.g., in a non-urban environment, the location of device 102 is determined based on the time-of-flight of signals received from multiple satellites. For example, if buildings 104a and 104b were not present, then the position of mobile device 102 could be triangulated based on the time of flight of signals 108a, 108b, 108c, and 108d wherein time of flight is utilized to determine a distance of mobile device 102 from each of the plurality of satellites 104a, 104b, 104c, and 104d.

FIG. 1 illustrates how the presence of buildings 104a and 104b may result in a noisy position estimate. In this particular example, signal 108a provided by satellite 104a is completely blocked by building 104a, and thus no information is obtained regarding the location of mobile device 102. For purposes of this discussion, signal 108a is described as a "blocked signal."

Signal 108b provided by satellite 104b is not completely blocked, but the path between satellite 104b and mobile device 102 includes a plurality of reflections—in this case one reflections off of building 104b and one reflection off of building 104a. For purposes of this discussion, signal 108b is a "non-line-of-sight" (NLOS) signal. The reflection results in an increase in the time-of-flight of signal 108b as compared to a direct path between satellite 104b and mobile device 102, as well as a decrease in the signal-to-noise ratio (SNR) of signal 108b. Without taking into account the decrease in SNR, location estimates based on signal 108b will tend to overestimate the distance of mobile device 102 from satellite 104b. The result is an erroneous GNSS location estimate.

Signal 108c provided by satellite 104c is not obstructed by any buildings or structures, and thus has a "line-of-sight" (LOS) path to mobile device 102. The lack of reflections results in a GNSS signal that provides a high SNR.

Signal 108d provided by satellite 104d is obstructed by building 104b. However, signal 108d only requires a single reflection—off building 106a—to reach mobile device 102. Thus, while the signal remains a NLOS signal, the SNR measured by mobile device 102 may be significantly higher than a multiple reflection signal such as signal 108b.

As described in more detail below, an embodiment uses information made available by single reflection signals, referred to herein as first order reflections, in generating a location estimate for mobile device 102. In particular, first order reflections can be utilized to select between two hypothesized locations. In the embodiment shown in FIG. 1, the user is hypothesized to be located either on the left side of the street at hypothesized location 110a, or on the right side of the street at hypothesized location 110b.

Figure 2:
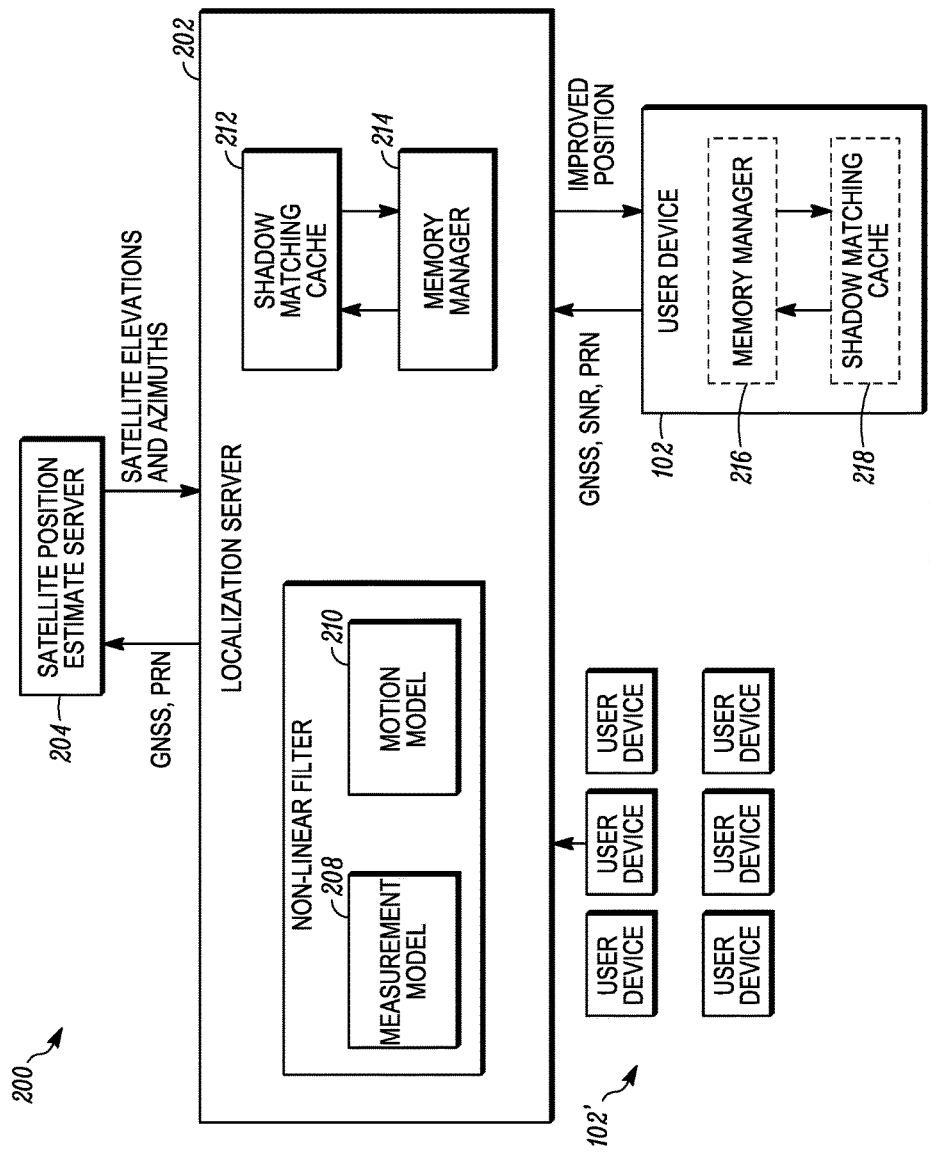
FIG. 2 is a block diagram of the localization and tracking system according to an embodiment.

FIG. 2 is a block diagram of the localization and tracking system 200 according to an embodiment. In the embodiment shown in FIG. 2, system 200 includes localization server 202, satellite position estimate server 204, and a plurality of user devices 102'. Localization server 202 includes non-linear filter 206, measurement model(s) 208 and motion model 210, and shadow matching cache 212. Location server 202 may include one or more processors (not shown) and memory (not shown) for implementing and storing non-linear filter 206, associated models 208 and 210, shadow matching cache 212, memory manager 214, and processor-executable instructions for implementing the system 200.

In addition, while the embodiment shown in FIG. 2 processes information remotely from user device 102, in other embodiments the functions and analysis performed by localization server 202 may be implemented locally by user device 102. In other embodiments, functions and analysis may be bifurcated between remote location server 202 and user device 102 in any suitable way. For example, in one embodiment, shadow matching cache 212 or at least the portion of shadow matching cache 212 relevant to the location of a particular user device 102 is communicated to and stored locally by user device 102. In one such embodiment, user device 102 includes local memory manager 216 and local shadow matching cache 218 to communicate with localization server 202 and load relevant shadow matching data into local shadow matching cache 218 (represented by dashed lines to indicate this is one of many possible ways in which information may be stored and processed by localization and tracking system 200). In one embodiment, memory manager 214 distributes at least a portion of shadow matching cache 212 to user device 102. As described in more detail below, the selection of data from shadow matching cache 212 to be distributed to user device 102 may be based on location data provided by user device 102 to localization server 202.

In the embodiment shown in FIG. 2, user device 102 (along with other user devices 102') provide GNSS position data, measured SNR data for each satellite signal received, pseudo-random noise (PRN) code identifying each of the satellites communicating with the particular user device 102, and the coordinates (azimuth and elevation) for each satellite signal received. It will be appreciated that one or more of the listed data items, such as the coordinates data, can be omitted in alternative example embodiments.

Localization server 202 implements a non-linear filter (e.g., particle filter) 206 to fuse received measurement data, including GNSS position fix data and SNR data, to compute a conditional distribution of a user position. To do this, non-linear filter 206 utilizes motion model 210 to predict the movement of the target or user device being tracked, and measurement model 208 to model how the current measurement is related to the current state. In one embodiment the motion model is expressed as $$x_t = f(x_{t-1}, u_t) \quad (1)$$

which maps the previous state $x_{t-1}$ (e.g., position, velocity of the target) and a control $u_t$ to the current state $x_t$. In one embodiment, $u_t$ is modeled as a complete unknown (e.g., modeled as zero mean noise) because no information regarding the intent of the target/user is available. In other embodiments, additional information may be available and $u_t$ may be modeled to reflect that information. In addition, the measurement model is expressed as $$[y_t, z_t] = g(x_t, v_t) \quad (2)$$

which maps the current state $x_t$ and random noise $v_t$ to the observed GNSS fix (e.g., position) $y_t$ and $N_t$ SNR measurements $z_t = [z_{t,1} \ldots, z_{t,N_t}]^T$.

Given measurement model 208 and motion model 210, non-linear filter 206 (e.g., a modified particle filter) is utilized to determine the probability of a particular receiver state (e.g., position $x_t$) conditioned on all previous GNSS measurements $y_{1:t}$ and SNR measurements $z_{1:t}$ (i.e., posterior distribution) modeled as a set of K particles (representing hypothesized user device locations), expressed as follows:

$$p(x_t | y_{1:t}, z_{1:t}) = \Sigma_{k=1}^{K} w_t^{(k)} \delta_{x_t^{(k)}}(x_t) \quad (3)$$

wherein $w_t^{(k)}$ represents a weight and $x_t^{(k)}$ a state (e.g., position, velocity, etc.) associated with each of the plurality of K particles, wherein $\delta_a(b)$ is the Dirac measure (equals 1 if a=b and 0 otherwise), and wherein $y_{1:t}, z_{1:t}$ refer to all the measurements from time 1 (the initial time instant) to time instant t. While other types of non-linear filters may be utilized, one example embodiment utilizes a particle filter to handle the multi-modal distributions generated as a result of arbitrarily shaped satellite shadows. Particle filters are particularly adept at analyzing multi-modal distributions.

Motion Model

As discussed above, the motion model is utilized to predict possible locations of a user device being tracked. That is, given a plurality of possible locations in a previous time step, the motion model 210 predicts possible particle locations (representing potential user device locations) in the next time step given what knowledge is available regarding the user (e.g., intent, speed, direction).

In one embodiment the motion model is constructed to describe continuous horizontal (2D) motion within 3D space. For example, the state x of a pedestrian user can be described as $x=[r_x, \dot{r}_x, r_y, \dot{r}_y, r_z]$ wherein $r_e$ and $\dot{r}_e$ refer to position and velocity along axis e. In one embodiment, the above motion model 210 is utilized to represent the motion of pedestrians. In other embodiments the motion model may be modified to represent the movement of vehicles by including information regarding how vehicles are allowed to move, including constraints such as how quickly a vehicle is allowed to turn ω and whether the vehicle is allowed to leave the road. In addition, the motion model may be extended to track objects capable of moving through 3D space (e.g., drones, airplanes, people in buildings, etc.).

In one embodiment, the motion model 210 models the possible position coordinates as particles and non-position coordinates (e.g., velocity) as distributions (e.g., Gaussians) such that the motion model can be expressed as follows:

$$p(x_t|y_{1:t}, z_{1:t}) = \sum_{k=1}^{K} w_t^{(k)} N(x_t|x_t^{(k)}, A_t) \quad (4)$$

wherein the covariance A is singular (zeroes filling rows and columns) in the position dimensions, and wherein N(·|m, C) represents a multivariate Gaussian distribution, with mean m and covariance matrix C. A baseline motion model is one with Gaussian dynamics:

$$x_t = \Phi_t x_{t-1} + u_t \quad (5)$$

wherein $\Phi_t$ is the state transition matrix and $u_t \sim N(0, Q_t)$ is the process noise. In one embodiment, times t and t−1 are separated by about one second. In addition, in one embodiment the pedestrian and vehicular models utilize a Nearly Constant Velocity (NCV) model. The framework is generally applicable to the form:

$$x_t = f(x_{t-1}) + u(x_{t-1}) \quad (6)$$

wherein $u(x_{t-1})$ is Gaussian.

Measurement Model

As discussed above, the measurement model 208 acts to map the current state $x_t$ and random noise $v_t$ to the observed GNSS position estimate $y_t$ and $N_t$ SNR measurements $z_t = [z_{t,1}, \ldots, z_{t,Nt}]^T$. That is, the measurement model determines the probability of a particle being located at various locations given received measurement data (e.g., GNSS fix data, SNR). Therefore, the measurement model comprises several individual models to handle the GNSS position estimates received from user device 102 and SNR measurement received from user device 102. Each model is described is described in turn.

SNR Measurement Model

With respect to the received SNR measurements, the goal is to determine the likelihood of a particle being located at a particular position $x_t$ given the observed SNR measurement $z_t$ and what we know about the environment. In particular, SNR measurements provide information regarding whether a signal is line-of-sight (LOS), non-line-of-sight (NLOS), or the result of a first order reflection. In addition, if 3D information is available regarding the urban environment, along with satellite location data, the location of various particle locations can be analyzed to determine whether it is likely that the signal will be blocked.

Alternatively, rather than calculate this information based on a 3D map of the environment and the locations of each satellite and possible user location, this information may be pre-calculated and stored to shadow matching cache 212 for lookup. This combination of SNR measurement data and position information within the environment that indicates whether or not a signal LOS, NLOS or a first order reflection, and information regarding the likelihood or probability of various locations being "shadowed" by the presence of a structure between the location and the satellite allows determinations to be made regarding how likely it is for a user device to be located at a particular location. For example, an SNR measurement indicating a line-of-sight (LOS) signal provides information regarding the likely location of the user based on 3D knowledge of the environment. For particle locations $x_t$ determined to be in the "shadow" of a building (with respect to a particular satellite) the conditional probability of receiving a SNR measurement indicating a LOS path is fairly low. Conversely, for particle locations $x_t$ determined not to have any structures located between the user device and the satellite, the conditional probability of receiving a SNR measurement indicating a LOS path is fairly high. In this embodiment, a 3D map is included to allow determinations to be made regarding whether a user device is located in the "shadow" of a structure such as a building.

However, as discussed in more detail below with respect to other embodiments, probabilities associated with whether the signal between a particular location and a particular satellite is blocked or unblocked (e.g., shadow matching data) may be calculated and stored to shadow matching cache 212. In one embodiment, shadow matching cache 212 maintains bins identifying possible ephemeris location data for available satellites, and calculates and stores for each ephemeris bin a blockage value for corresponding user locations x, which can be provided to the non-linear filter—and in particular to SNR measurement model—to estimate the conditional probability of a particle being located at a particular location given the measured SNR signal. In one embodiment, blockage values are represented as a probability of a signal being blocked. In embodiments in which memory manager 214 distributes at least a portion of shadow matching cache 212 to user device 102, memory manager 214 may utilize the location estimate (e.g., GNSS data) provided by user device 102 to select geographically relevant shadow matching data. For example, in one embodiment, the criteria for shadow matching data fetched and provided to user device 102 includes one or more of those satellites visible to user device 102. In other embodiment, this may include fetching shadow matching data relevant to a predetermined radius surrounding the received location estimate distributing, or fetching a predetermined amount of shadow matching data (e.g., set amount of data) to provide to user device 102, wherein the most geographically relevant shadow matching data is given priority until the predetermined memory allocation has been satisfied. In other embodiments, memory manager 214 loads and maintains shadow matching cache 212 remotely from user device 102. This may include adding shadow matching data to shadow matching cache 212 and retrieving shadow matching data from shadow matching cache 212 in support of localization server 202 and/or user device 102.

Calculation of the values stored by shadow matching cache 212 may require a 3D map m that is utilized in a ray tracking operation to determine the probability of whether a particular signal would be blocked or unblocked. For example, a 3D map m comprising an occupancy grid having a plurality of binary-valued "voxels" or "cells", wherein cell $m_i=1$ if the ith cell is occupied by something (e.g., building), and $m_i=0$ if the ith cell is unoccupied (e.g., empty space). In some embodiments, cells are not assigned a "hard" zero or one, but rather are associated an occupancy probability $o(m)=\{p(m_i=1)\}_i$, which is treated like measurement data. In this way, a 3D map is constructed that allows determinations to be made regarding the likelihood of a particle being located in the presence of a building (i.e., in the shadow).

In one embodiment, SNR measurements for the nth satellite at time t is denoted by $z_{t,n}$, $n=1, \ldots, N_t$ where $N_t$ represents the number of satellites in view. In the embodiment shown in FIG. 2, user device 102 also provides PRN information that identifies the satellites for which SNR data is received. In this embodiment, PRN information provided to localization server 202 is provided to satellite position estimate server 204, which in response provides satellite ephemeris data—including elevation and azimuth data $[\theta_{t,n}, \phi_{t,n}]$—which is considered noiseless. In other embodiments, user device 102 may provide satellite elevation and azimuth data $[\theta_{t,n}, \phi_{t,n}]$ based on information received from the satellite, while in still other embodiments localization server 202 maintains this information locally. Based on a hypothesized location $x_t$ of a user (e.g., particle), a ray extending from this location to the satellite is determined to be LOS if only unoccupied cells are crossed. In contrast, if a ray passes through at least one occupied cell, it is classified as NLOS. In another embodiment, based on the hypothesized location $x_t$ of a user (e.g., particle) and the received ephemeris data, the shadow matching cache is searched for a corresponding location/ephemeris pair (x, e), and the probability of the signal being blocked or unblocked is returned.

While in some embodiments a threshold could be utilized to determine whether a measured SNR signal represents a LOS signal path or NLOS signal path, in this embodiment the probability of measured SNR signal representing a LOS path or NLOS path is expressed as separate distributions. For example, in one embodiment a LOS path is expressed as a Rician distribution, in which the distribution is centered around a relatively high SNR value and has a lower spread. Conversely, an NLOS path may be expressed as a log-normal distribution having a smaller mean and higher spread. For example, the Rician distribution can be expressed as:

$$f_{los}(r_{dB}) = \frac{\ln 10}{20} 10^{r_{dB}/20} f_{Rice}(10^{r_{dB}/20}) \quad (7)$$

wherein $$f_{Rice}(r) = \frac{2(K_R+1)r}{\hat{\Omega}} \exp\left(-K_R - \frac{(K_R+1)r^2}{\hat{\Omega}}\right) \times I_0\left(2\sqrt{\frac{K_R(K_R+1)}{\hat{\Omega}}} r\right), \quad (8)$$

$$r \geq 0$$

is the Rician fading density, $I_0(\bullet)$ is the $0^{th}$ order modified Bessel function of the first kind $\hat{\Omega}$ is the estimated total channel power, and $K_R$ is the Rician "K factor" (ratio of LOS to diffuse power). With respect to the NLOS log-normal fading model, in decibels it is simply described by a normal density with mean $\mu$ and variance $\sigma^2$.

Assuming map m does not change, the SNR measurements can be modeled as conditionally independent given the map and poses, yielding the following factorization:

$$p(z | m, x) = \prod_{t,n} p(z_{t,n} | m, x_t) \quad (9)$$

However, in reality the SNR of a given GNSS signal depends on a number of factors such as environmental parameters and satellite elevation, and a number of useful statistical models may be utilized to model these factors, such as Land to Mobile Satellite (LMS) channels of interests. However, a simplification of an inference algorithm is obtained using the following sensor model:

$$p(z_{t,n} | m, x_t^{(k)}) = \begin{cases} f_{los}(z_{t,n}), & m_i = 0 \, \forall \, i \in M(t, n, k) \\ f_{nlos}(z_{t,n}), & \text{otherwise} \end{cases} \quad (10)$$

where M (t, n, k) contains the indices of cells intersected by the ray originating at particle $x_t^{(k)}$, in the direction of satellite n at time t.

When the map is probabilistic rather than deterministic, each individual SNR measurement is modeled as a binary mixture (rather than as true or false), wherein the satellite is either LOS with probability p or NLOS with probability 1–p. In one embodiment, this is modeled as:

$$p(z_{t,n}|x_t^{(k)}, o(m)) = pf_{los}(z_{t,n}) + (1-p)f_{nlos}(z_{t,n}) \quad (11)$$

where $f_{los}$ and $f_{nlos}$ are the LOS and NLOS likelihoods, respectively and $$p = \prod_{i \in M(t,n,k)} p(m_i = 0) \quad (12)$$

That is, if one cell is identified as occupied then all cells associated with that particle-satellite ray trace are identified as occupied and do not required additional analysis of other cells/voxels. This provides a dramatic improvement in the computationally complexity, while providing very good performance. In another embodiment, additional improvements may be obtained by including in the LOS/NLOS distribution a dependence on satellite elevation, wherein satellites at higher elevations are presumed to provide a greater LOS likelihood.

In general, a log normal shadowing model is used for NLOS distributions and Nakagami car Rician multipath fading model is used for the LOS distribution. However, in other embodiments other models may be utilized, including composite multipath and shadow fading models such as Generalized-K for NLOS distributions. In another embodiment, the LOS model is provided as follows:

$$f_{los}(z_{t,n}) = (1-\beta)f_{los}^{nom}(z_{t,n}) + \beta f_{los}^{noise}(z_{t,n}) \quad (13)$$

where $f_{los}^{nom}$ is the nominal (Rician or Nakagami) distribution and $f_{los}^{noise}$ is the noise distribution, which has been taken to be either uniform over the SNR dynamic range or the nominal NLOS distribution (sometimes referred to as the "confusion" or "swap" model).

In this way, SNR measurement model 208 provides a simplified method of calculating the (conditional) likelihood of a particular being located at a particular location $x_t$ given SNR measurements $z_t$ and occupancy map o(m) and/or pre-calculated shadow matching data provided by shadow matching cache 212.

In another embodiment, the measurement model 208 (e.g., satellite SNR model) may take into account first order reflections in determining the location of user device 102. In one embodiment, first order reflections are most useful when employed in an urban canyon (e.g., tall building on each side), and can be particularly useful in distinguishing between hypothetical locations, both of which are determined to be at least partially blocked. Under these circumstances of relatively high SNR and hypothesized locations determined to be at least partially blocked, it can by hypothesized that the received signal is a first order reflection, not a LOS signal. If the SNR signal were lower (e.g., below some threshold), then it would be more likely that the propagation path involved multiple reflections. Similarly, if the blocking probability between one or more of the hypothesized locations are not determined to be blocked, then in combination with the relatively high SNR it is determined that it is likely that the signal is LOS.

In this way, a user device located in an urban canyon between two large buildings will either have LOS to high elevation satellites located approximately directly above the user, or will be entirely blocked with respect to lower elevation satellites regardless of which side of the street the user is on (and thus cannot be used to distinguish between one side of the street or the other). For those satellites that are NLOS, but at a medium-high elevation, the glancing angle is relatively small (i.e., the incidence angle is relatively large on a scale of 0°-90°). As a result of the relatively small glancing angle the SNR measured by the user device is relatively high (e.g., exceeds a threshold indicating the signal is not reflected multiple times). Although the first order reflection does not directly provide useful information regarding the distance of the user from the satellite, identification of the signal as a first order reflection is useful in distinguishing between hypothetical locations (e.g., between hypothetical locations located on different side of a street). For example, in the embodiment shown in FIG. 1, two locations are hypothesized as possible locations of user device 102—a first 110a located on the left side of the street and the second 110b located on the right side of the street. Neither of the hypothesized locations 110a, 110b has a LOS path to satellite 104d. However, assuming a single reflection at a high incidence angle that results in a high SNR, then the hypothesized location on the right side of the street is more likely (i.e., the same side as that of the satellite from which the signal originates). Based on the location of satellite 104d, a signal received on the left side of the street would likely require more than a single reflection, and therefore would result in a lower SNR. In this way, single order reflections may be utilized in further refining position estimates.

GNSS Position Estimate Model

Typically, the GNSS location fix is given as $y_t=Hx_t+e_t$, where the covariance of the error $e_t$ is estimated using standard Dilution of Precision computations, and where H is the measurement matrix which serves to capture only the position coordinates of the state. However, these computations assume that signals received by user device 102 are LOS, as opposed to strong reflections with the LOS path blocked. To account for the possibility of outliers generated as a result of strong reflections (signals having relatively high SNR values, despite a NLOS path), the GNSS position estimate model 214 is modified by modeling the GNSS position fix as a mixture of a reported Gaussian $\tilde{y} \sim N(x_t, C_t)$ (wherein the covariance can be estimated using standard Dilution of Precision techniques) and an outlier vector $e_t$ which is derived from a broader multivariate elliptical distribution, such that $$y_t=(1-\alpha)\tilde{y}+\alpha e_t \quad (14)$$

where $\alpha$ is the outlier probability. In one embodiment, the outlier probability $\alpha$ is coarsely adapted by scenario (e.g., adjusted based on the environment, with the value of $\alpha$ increasing for more built-up environments likely to generate more outlier conditions). In this way, the measurement model 208 is modified using an adaptive outlier model to allow the GNSS position estimate to be given less weight when the user is located within an environment assigned a high value of $\alpha$ (e.g., built-up environment) to account for the likely errors generated as a result of strong reflections. The GNSS position estimate model may also be modified to accommodate first order reflections. However, in one embodiment utilization of first-order reflections utilizes ephemeris data associated with the satellite and SNR data associated with the received satellite signal, and therefore is better included in the SNR measurement model.

Overall Measurement Model

The SNR measurement model and GNSS position estimate model can be expressed as an overall measurement model, which is non-linear and non-Gaussian. Simultaneous measurements of GNSS data and SNR data are assumed to be conditionally independent given the receiver state:

$$p(y_t, z_t | x_t) = p(y_t, z_t | x_t, o(m)) = p(y_t | x_t) \prod_n p(z_{t,n} | x_t, o(m)) \quad (15)$$

for which is introduced a dependence on the map occupancy probabilities $o(m)=\{p(m_i=1)\}$. In one embodiment, the dependency on the map occupancy probabilities can be averaged out as follows:

$$P(SNR(s)=SNR|x,e)=$$
$$\Sigma_{b \in B} P_{device,satellite-type}(SNR|b) P(b(x,e(s))) \quad (16)$$

The shadow matching posterior p(x|satellite SNRs) is proportional to the product of such densities across the different satellites.

The Non-Linear Filter

Various types of non-linear filters 206 may be utilized to determine location based on the received GNSS data, SNR data and respective measurement models 208 and motion models 210. However, because the measurement model 208 is non-linear and non-Gaussian, a type of non-linear filter known as a particle filter (PF) may be utilized in embodiments. In general, a PF operates by generating a posterior distribution of the state by putting weights at a set of hypothesized state values, or particles. The particles are propagated probabilistically to obtain a new set of particles and weights at time t+1, based on the dynamics of the motion model 210, and the new set of measurements (e.g., GNSS, SNR measurements). As described in more detail with respect to FIGS. 3 and 4, embodiments may make use of several different types of particle filters such as a modified bootstrap particle filter and a more advanced particle filter. A bootstrap PF can provide convenient implementation.

The advanced PF can reduce the likelihood of particles being trapped in local maxima of the posterior distribution by sampling from distributions that take into account the most current measurements, and may include a particle reset function in which particles are sampled from a likelihood surface rather than being confined to the results of the motion model. As a result, the advanced PF is able to explore the 3D (or 2D) space outside of the confines of the motion model 210, which helps avoid trapping of particle locations in local maxima, thereby yielding significant system robustness.

Figure 3:
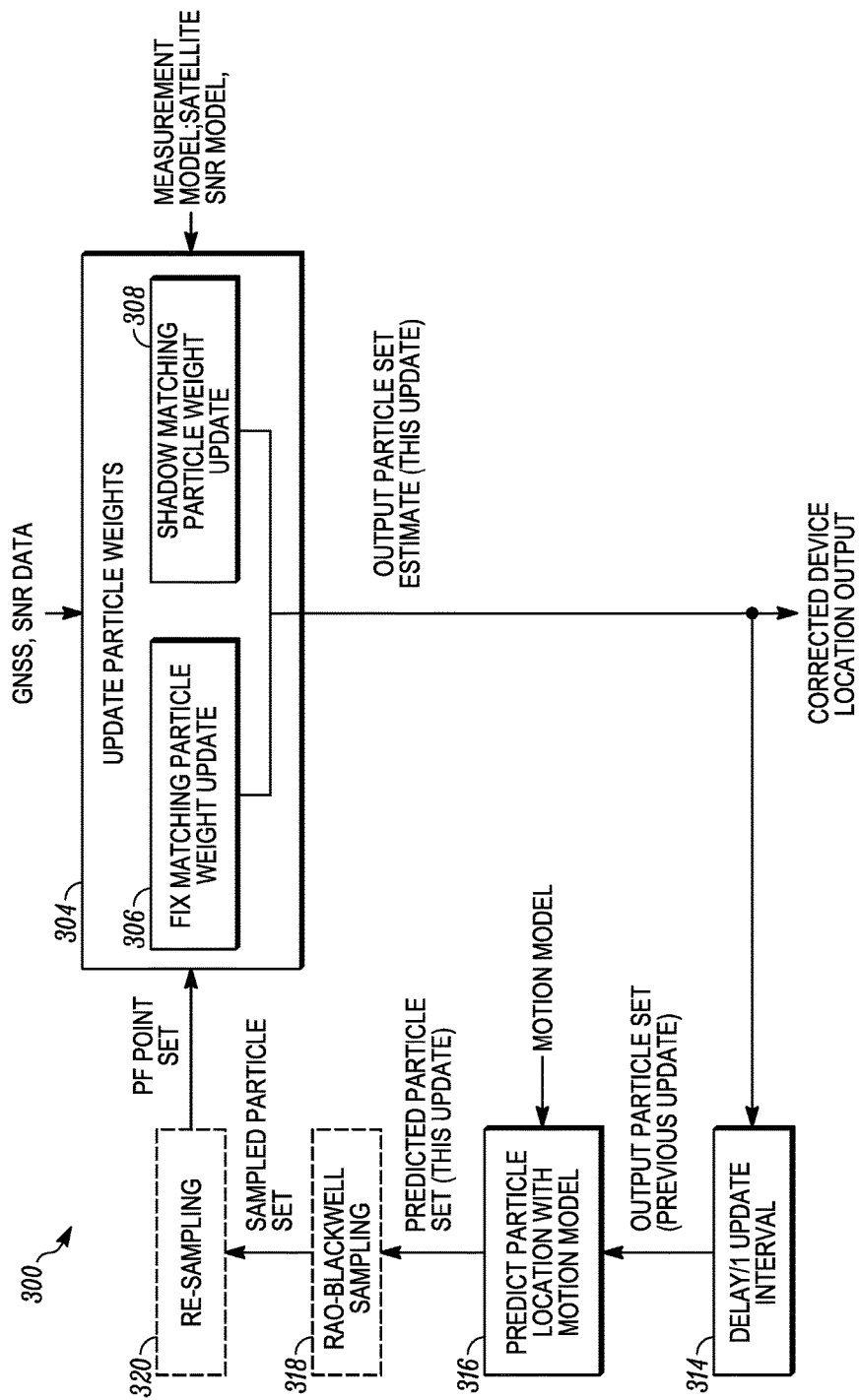
FIG. 3 is a flowchart that illustrates steps performed by the localization server using a bootstrap particle filter according to an embodiment.

FIG. 3 is a flowchart that illustrates a method 300 of determining user position according to an embodiment that utilizes the bootstrap PF. Steps that are optional are illustrated using dashed boxes. However, the use of dashed boxes for optional steps does not imply that boxes illustrated in solid lines are necessarily required in each embodiment. Furthermore, it will be appreciated that the steps of method 300 can be performed in any suitable manner that achieves its function. In general, method 300 provides a probabilistic framework for determining/improving the location estimate generated by the user device that accounts for both modeling uncertainties and measurement noise. Inputs provided to method 300 include GNSS data and SNR data provided by the user device, wherein SNR data is provided with respect to each satellite with which the device is communicating.

Prior to a first iteration, a particle set is initialized based on the received GNSS and SNR data. In one embodiment, initialization includes sampling particles from an arbitrary distribution $q(\cdot)$ centered on the position provided by the GNSS data. Afterwards, the each particle location x is weighted by the ratio $p(x)/q(x)$, where $p(\cdot)$ represents an evaluation of the measurement model using the initial measurement data. In subsequent iterations, the sample set of particles (e.g., PF Point set) is provided by the motion model.

For purposes of this discussion, it is assumed that at least one iteration has already been performed. An output particle set is generated that includes a plurality of weighted particles, each weighted particle representing a potential location of the user device, when the magnitude of the weight indicates the likelihood (with heavier weights indicating a higher likelihood than lower weights). A motion model is utilized at step 316 (described in more detail below) to predict the location of the particles in the next time-step, which results in generation of particle position distributions and velocity distributions representing possible position/velocity estimates for each particle. At step 318, some form of sampling is provided (e.g., Rao-Blackwell sampling) to reduce particle position distributions to a point for subsequent analysis by shadow matching techniques. The sampled particle set is then provided to step 304 to update particle weights via fix matching and shadow matching techniques.

At step 304 measurement models are utilized to update particle weights associated with a provided PF particle set based on newly received measurement data (GNSS fix data and SNR data) and various models.

In particular, at step 306 the received GNSS fix data is compared to the plurality of proposed particles included in the PF particle set. Weights are then assigned to those particles based on how likely they are in view of the new GNSS data. This step is referred to as fix matching because it relies on the most recently acquired GNSS fix or position information. However, as discussed above the presence of strong reflections may be prevalent in built-up environments and may distort the received GNSS data. To mitigate the effect of reflections in distorting the GNSS fix data, an adaptive outlier model described with respect to equation 14, above, may be utilized wherein the outlier probability $\alpha$ is coarsely adapted based on the environment (e.g., adjusted based on the environment, with the value of $\alpha$ increasing for more built-up environments likely to generate more outlier conditions). In this way, the GNSS position estimate can be given less weight when the user is located within an environment assigned a high value of $\alpha$ (e.g., built-up environment) to account for the likely errors generated as a result of strong reflections. As a result, the weights generated by other measurements models—such as the SNR measurement model—have greater influence.

In addition to problems of strong reflections, GNSS fixes sometimes exhibit an attractor or correlation problem. In particular, in response to a user remaining stationary for a period of time (e.g., few seconds), and because the GNSS measurements are assumed to be independent identically distributed (iid) Gaussian, the PIP filter can be attracted or drawn towards the erroneous—and stationary—GNSS estimate, even when inconsistent with the shadow matching SNR estimates. In one embodiment, step 306 further utilizes a decorrelation model that de-emphasizes particle weights deduced from noisy GNSS data. In general, successive fixes which overlap more are determined to be more correlated. By estimating the overlap parameter $o_t \in [0, 1]$ at each time t, the GNSS position estimate model can be re-written to incorporate a de-correlation model $$y_t = Hx_t + (1-o_t)e_t + o_t n_t \quad (17)$$

where $n_t$ is a very broad, elliptically bounded uniform density centered at zero. As the overlap $o_t \to 1$, $p(y_t|x_t)=$ constant in a large region, and successive fixes do not impact particles in this region, effectively mitigating successive GNSS updates. Conversely as $o_t \to 0$ the original fix density is recovered which allows the GNSS position estimate to take advantage of the new information. In this way, fix matching particle weight updates provided at step 306 may make use of one or more models, such as the adaptive outlier model an decorrelation model to improve the quality of the particle weights assigned.

At step 308, particle weights are similarly updated based on the received SNR measurements. As described above with respect to the SNR measurement model, shadow matching provides a mechanism for further identifying how likely it is a user device 102 is located at a particular particle position based on the SNR measurements $z_t$ monitored by the user device with respect to the plurality of available satellites. In one embodiment, shadow matching particle weight updates incorporates first order reflections in the analysis. In one embodiment, in response to a measured SNR value that is relatively high—indicating either a LOS signal or a single reflection—the shadow matching particle weight update reviews to determine whether the hypothesized location of the user have a LOS path to the satellite. If not, the shadow matching particle weight update assumes a first order reflection in determining the most likely location of the user device. In addition, various shadow matching techniques—including a lightweight shadow matching technique—may be utilized to update particle weights based on the received SNR data.

The particle weight updates generated by fix matching and shadow matching as part of step 304 can be expressed as $$w_t^{(k)} \propto w_{t-1}^{(k)} p(z_t, y_t | x_t^{(k)}) \quad (18)$$

which illustrates that the updated weight is a function of the previous weight and the probability of the user device being located at particle $x_t^{(k)}$ given the most recent SNR measurement $z_t$ and position fix measurement $y_t$. Although made explicit, the order in which particle weight updates are made at step 304 (i.e., calculation of fix matching particle weights first, or shadow matching particle weights) is unimportant, as the resulting weights are multiplied with one another to generated the combined particle weight updates. In addition, in one embodiment particle weight updates are only calculated in response to updated or current measurement data. For example, if updated GNSS data is received, but no updated SNR data is received, then particle weights may be updated based only on the fix matching particle weight update, with the shadow matching particle weight update skipped until updated SNR data becomes available, and vice versa. In this embodiment, particle weight updates reflect receiving updated or new measurement data.

The output of the particle weight update provided at step 304 is a nominal output particle set, which can be utilized to determine a point estimate identifying the estimated location of user device 102 based on a minimum mean square error (MMSE) defined as:

$$\hat{x}_t = E(x_t) = \sum_k w_t^{(k)} x_t^{(k)} \quad (19)$$

In addition, the uncertainty associated with the estimate location is defined as the radius around $\hat{x}_t$ that captures 68% of the particle mass. In some embodiments this is the output provided to the user device to improve localization of the user device. In other embodiments additional operations may be performed on the nominal output particle set generated at step 304. As described briefly above, steps 314-320 describe how particles included in the output particle set estimate (i.e., current update) are propagated in time to generate a predicted particle set, which is sampled to provide an PF point set that is provided in feedback to aid in the updating of the particle weights at step 304.

In particular, at step 314 the output particle set estimate is delayed for a length of time corresponding with the update interval (e.g., 1 second, 10 seconds, etc.). Following the delay at step 314, the output particle set estimate identified as corresponding to the present or current update is now designated as corresponding to the previous update.

At step 316, the motion model is utilized to predict particle locations based on the output particle set. As described above with respect to equations (4)-(6), the motion model generates a predicted particle set representative of this update (i.e., current update). In the bootstrap PF, the predicted particle set for the kth particle, $q(x_t|x_{t-1}^{(k)})$ is taken to be the motion predicted distribution, which for the nominal linear Gaussian model leads to $$x_t^{(k)} \sim q(x_t|x_{t-1}^{(k)}) = p(x_t|x_{t-1}^{(k)}) = N(x_t|\Phi_t \hat{x}_{t-1}^{(k)}, \Phi_t \Lambda_{t-1} \Phi_t^T + Q_t) \quad (20)$$

At step 318, the predicted particle set is sampled using Rao-Blackwell sampling to select a sampled particle set from the motion predicted distribution. In particular, the motion model generates with respect to each particle location a distribution of possible locations predicted in the future time step, along with a distribution of possible velocities. The Rao-Blackwell sampling provides a mechanism for restricting the motion predicted distribution generated at step 316 to a point mass that can be utilized as an input to the shadow matching particle weight update at step 308. One of the benefits of utilizing the Rao-Blackwell sampling is that it is a linear calculation (along with motion model utilized to predict particle locations). The Rao-Blackwell sampling does not sample velocity distributions, but rather allows predicted velocity distributions created by the motion model to be updated using standard conditional Gaussian equations. In other embodiments, other sampling techniques may be utilized to select point masses from the motion predicted distributions At step 320, the particles are re-sampled as necessary to avoid particle collapse. In general, particle re-sampling at step 320 allows low weight particles (i.e., particles with a very low probability of representing a possible user location) to be removed from the particle set to prevent subsequent analysis of these particles. Depending on a confidence associated with generated models, particle re-sampling at step 320 does not need to be performed at every iteration, and for highly confident models may be performed somewhat infrequently. In one embodiment re-sampling at step 320 is optionally performed if the effective sample size $$\hat{K}_t = \left(\sum_k (w_t^{(k)})^2\right)^{-1} \quad (21)$$

is below a threshold. The resulting PF point set is provided to step 304 to be updated based on the most recently received measurement data (GLASS fix, SNR). Step 320 may be omitted in other example embodiments.

Figure 4:
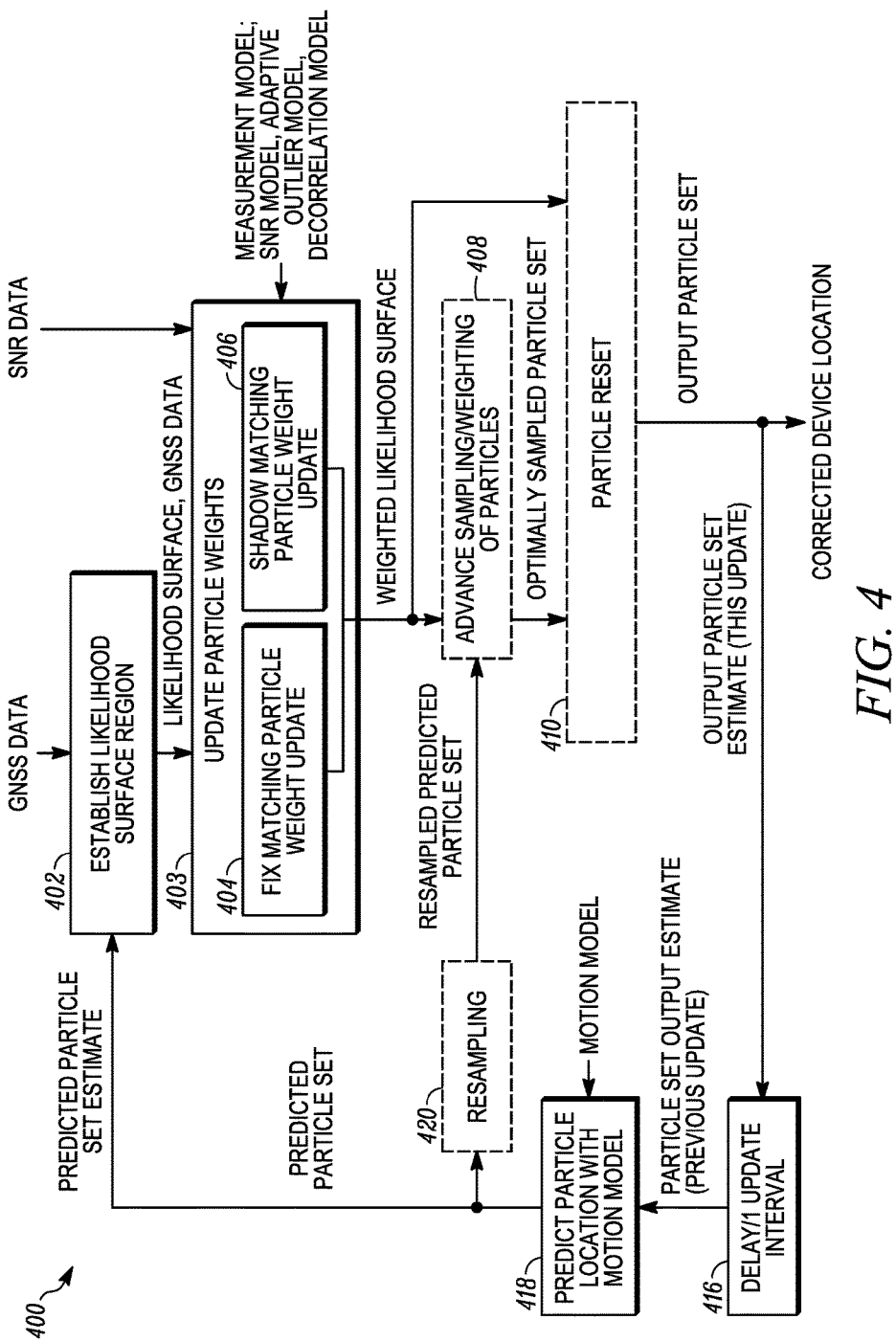
FIG. 4 is a flowchart that illustrates steps performed by the localization server using an advanced particle filter according to an embodiment.

FIG. 4 is a flowchart that illustrates a method 400 of determining user position according to an embodiment that utilizes an advanced particle filter (PF). Steps that are optional are once again illustrated using dashed boxes. However, the use of dashed boxes for optional steps does not imply that boxes illustrated in solid lines are required. Furthermore, it will be appreciated that the steps of method 400 can be performed in any suitable manner that achieves its function. In general, method 400 provides a probabilistic framework for determining the location of a user that accounts for both modeling uncertainties and measurement noise.

Inputs provided to method 400 include GNSS data and SNR data. One of the drawbacks of the bootstrap PF described with respect to FIG. 3 is that particles are drawn from the output of the motion model, which may result in particles becoming trapped in local maxima of the posterior distribution (which is particularly common in urban environments). The advanced PF described with respect to FIG. 4 overcomes this shortcoming by sampling from an optimal proposal distribution that takes into account the current measurements, as opposed to sampling from the motion model. A benefit of sampling particles in this way is that it allows particles to be drawn from a wider range of possibilities than if constrained to sampling from the motion model. In this way, the advanced PF samples particles in a way that allows additional particle locations to be analyzed (i.e., allows the particles to explore the 3D space more freely) and therefore avoids particles becoming trapped in locations due to the inability of the particles to escape the confines of the motion model.

In particular, at step 402 the advanced. PF establishes a likelihood surface (LS) based on received GNSS data. In general, the likelihood surface defines for a large area likely regions or locations where a user may be located. For example, in one embodiment the likelihood surface is created at step 402 by computing a kernelized estimate of the measurement surface with support in the 3D (x, y, and z) position space:

$$p(z_t, y_t | x_t) \approx \sum_{i=1}^{M} \rho_t^{(i)} N(x_t | \mu_t^{(i)}, \Sigma) \quad (22)$$

with kernel weights $$\rho_t^{(i)} = p(y_t | \mu_t^{(i)}) \prod_n p(z_{t,n} | \mu_t^{(i)}) \quad (23)$$

and circular bandwidths $\Sigma = \sigma^2 I_3$ that define the spread/size of the likelihood surface. In one embodiment, kernel centers $\{u_t^{(i)}\}_{i=1}^{M}$ are generated on a regular lattice face centered cubic lattice) with inter kernel distances on f meter scale (e.g., 1-2 meters), and selected as the union of ellipses/ellipsoids around the GNSS position fix and motion predicted particle set (generated at step 418 by the motion model). The size of the ellipses/ellipsoids may be varied based on a trade-off between computational complexity and breadth of particles to include for analysis. The larger the ellipse, the greater the intersection between the respective ellipses surrounding the GNSS position fix and motion predicted particle set, and the larger and more computationally complex the generated likelihood surface becomes). In one embodiment, the size of the ellipse/ellipsoids is selected to represent approximately five sigma deviation around the GNSS position fix and particles included in the motion predicted particle cloud.

Having established the LS at step 402, particle weights are updated at step 403 via fix matching particle weight updates provided at step 404 and shadow matching particle weight updates provided at step 406. As discussed above with respect to FIG. 3, GNSS fix matching particle weight update may utilize on one or more of the adaptive outlier model and the decorrelation model to determine the weight or influence to be given the GNSS position fix data. In other embodiments, the adaptive outlier model and/or decorrelation model may be implemented as part of establishing the likelihood surface region at step 402. Similarly, shadow matching particle weight update is provided at step 406 using the SNR model. Both the fix matching particle weight update and the shadow matching particle operate in much the same way as described with respect to the bootstrap PF shown in FIG. 3, with the likelihood surface being utilized as the particle filter point set. As described with respect to FIG. 3, shadow matching particle weight updates may incorporate first order reflections. In one embodiment, in response to a measured SNR value that is relatively high—indicating either a LOS signal or a single reflection—the shadow matching particle weight update reviews to determine whether the hypothesized location of the user have a LOS path to the satellite. If not, the shadow matching particle weight update assumes a first order reflection in determining the most likely location of the user device The outputs of the fix matching particle weight update and shadow matching particle weight update provided at steps 404 and 406 are combined (e.g., multiplied together) to generate a weighted likelihood surface. At step 408, the weighted likelihood surface may be optionally sampled/weighted based on the motion-predicted distribution generated by the motion model at step 418 (and optionally resampled at step 420).

The resulting particle proposal distribution is expressed as:

$$q(x_t | x_{t-1}^{(k)}, y_t, z_t) \approx \qquad (24)$$
$$\frac{1}{Z} N(x_t | \Phi_t x_{t-1}^{(k)}, \Phi_t \Lambda_{t-1} \Phi_t^T + Q_t) \sum_{i=1}^{M} \rho_t^{(i)} N(x_t | \mu_t^{(i)}, \Sigma)$$

The first portion of equation (24), $N(x_t | \Phi_t x_{t-1}^{(k)}, \Phi_t \Lambda_{t-1} \Phi_t^T + Q_t)$, represents the motion-predicted distribution generated by the motion model at step 418, and is identical to the motion predicted distribution utilized in the bootstrap PF as shown in Equation (24). The latter portion of equation (24) represents the weighted likelihood surface generated at step 403. The addition of the likelihood surface term provides for samples to be drawn from outside those particles proposed by the motion model and prevents particles from becoming trapped in local maxima if only the first term was ed. Particle weights may (optionally) be calculated at step 408 as follows:

$$w_t^{(k)} \propto w_{t-1}^{(k)} \int p(x_t | x_{t-1}^{(k)}) p(y_t, z_t | x_t) dx_t \qquad (25)$$

where the integral evaluates (approximately) to the sum of the weights of the Gaussian mixture for q(•) in equation (24), and represents a combination of the motion predicted particle set estimate calculated at step 418 (and optionally sampled at step 420) and the weighted likelihood surface calculated at steps 402 and 403. In one embodiment, because products of Gaussian distributions are themselves Gaussian, sampling from this distribution for each value k becomes a Rao-Blackwellized sampling from the Gaussian mixture q(•) in equation (28). Specifically, each particle selects a likelihood surface kernel location at random, with particle k selecting kernel i with probability proportional to $$\int N(x_t | \Phi_t x_{t-1}^{(k)}, \Phi_t \Lambda_t \Phi_t^T + Q_t) \cdot \rho_t^{(i)} N(x_t | \mu_t^{(i)}, \Sigma) dx_t \qquad (26)$$

Note that this expression is easy to evaluate due to the fact that the product of two Gaussian distributions is itself a (un-normalized) Gaussian distribution, and because any probability distribution integrates to one by definition. In this embodiment, particle k then assumes the position distribution $N(x_t | \mu_t^{(i^*)}, \Sigma)$ where i* is the index of the selected likelihood surface kernel. The non-position coordinates' distribution set according to the normal rules of Rao-Blackwellized (conditional Gaussian) sampling. Although this type of sampling is not difficult, it is computationally expensive: kernel selection probabilities must be computed for each kernel-particle pair, yielding a computational complexity of O(KM) where M is the number of likelihood surface kernels and K is the number of particles. Therefore, in one embodiment the sampling is modified to recognize that for clusters of nearby particles the vast proportion of proposed KDE kernel selection probabilities are very small, due at least in part to motion constraints. Hence, in general, for a cluster of particles only a small number M'<<M of the total likelihood kernels must be examined. This observation can be utilized by using a KD tree clustering on the particles and box and bound technique to provide an upper bound on the kernel selection probabilities by a small number (e.g., $10^{-6}$) for a given cluster of particles, and then prune those kernels from that clusters version of the KDE (likelihood surface). These operations may be performed in parallel across the plurality of clusters. Depending on the in-cluster particle spread, volume of the KDE support, firmness of motion constraints, etc., the complexity of the sampling operation may be reduced significantly. In another embodiment, KD trees for both the particles and likelihood surface are created (as opposed to just the likelihood surface), and computational efficiency is further improved.

In this way, advance sampling/weighting of particles at step 408 may be utilized to generate an optimally sampled particle set, wherein the optimally sampled particle set may be provided as the particle set estimate, or may optionally be provided as an input to one or more additionally optional steps (e.g., particle reset at step 410). These steps may be performed alone or in combination with one another.

In one embodiment, particle reset at step 410 allows a portion of the particles to be sampled from the likelihood surface (rather than from the motion model). In particular, because of the KDEs generated at step 402 as part of the likelihood surface, a portion of these particles can be sampled directly from the likelihood surface. The benefit of selecting particles directly from the likelihood surface is that it encourages the particle filter to explore different parts of the environment. In particular, localization space is oftentimes multimodal, and particle resetting in this manner encourages the particle filter to explore different locations and track more modes in the localization space.

In addition, the advanced PF provides the particle set estimate output (i.e., current update) in feedback to steps 416-420 in order to generate a predicted particle set. In particle, at step 416 a one update delay is introduced such that the particle set estimate output (current update) becomes the previous update as additional measurement data becomes available. For example, in one embodiment the delay value is set equal to approximately one second.

At step 418, the motion model is utilized to generate a predicted particle set estimate. The motion model utilized in the advanced PF operates in the same way as described with respect to the bootstrap PF. In particular, the motion model (as described with respect to Equations 4-6, above) generates a predicted particle set that represents how particles are predicted to propagate in a single time step. Once again, the predicted particle set of the kth particle, $q(x_t|x_{t-1}^{(k)})$ is taken to be the motion predicted distribution, which for the nominal linear Gaussian model leads to $$x_t^{(k)} \sim q(x_t|x_{t-1}^{(k)}) = p(x_t|x_{t-1}^{(k)}) = N(x_t|\Phi_t x_{t-1}^{(k)}, \Phi_t \Lambda_{t-1} \Phi_t^T + Q_t) \quad (27)$$

At step 420, the predicted particle set estimate is provided in feedback to step 402 to establish the likelihood surface in the next time step. In addition, the predicted particle set estimate may be provided in feedback—via resampling step 420—to advance sampling/weighting step 408 as described above in generation of the optimally sampled particle set.

Figure 5:
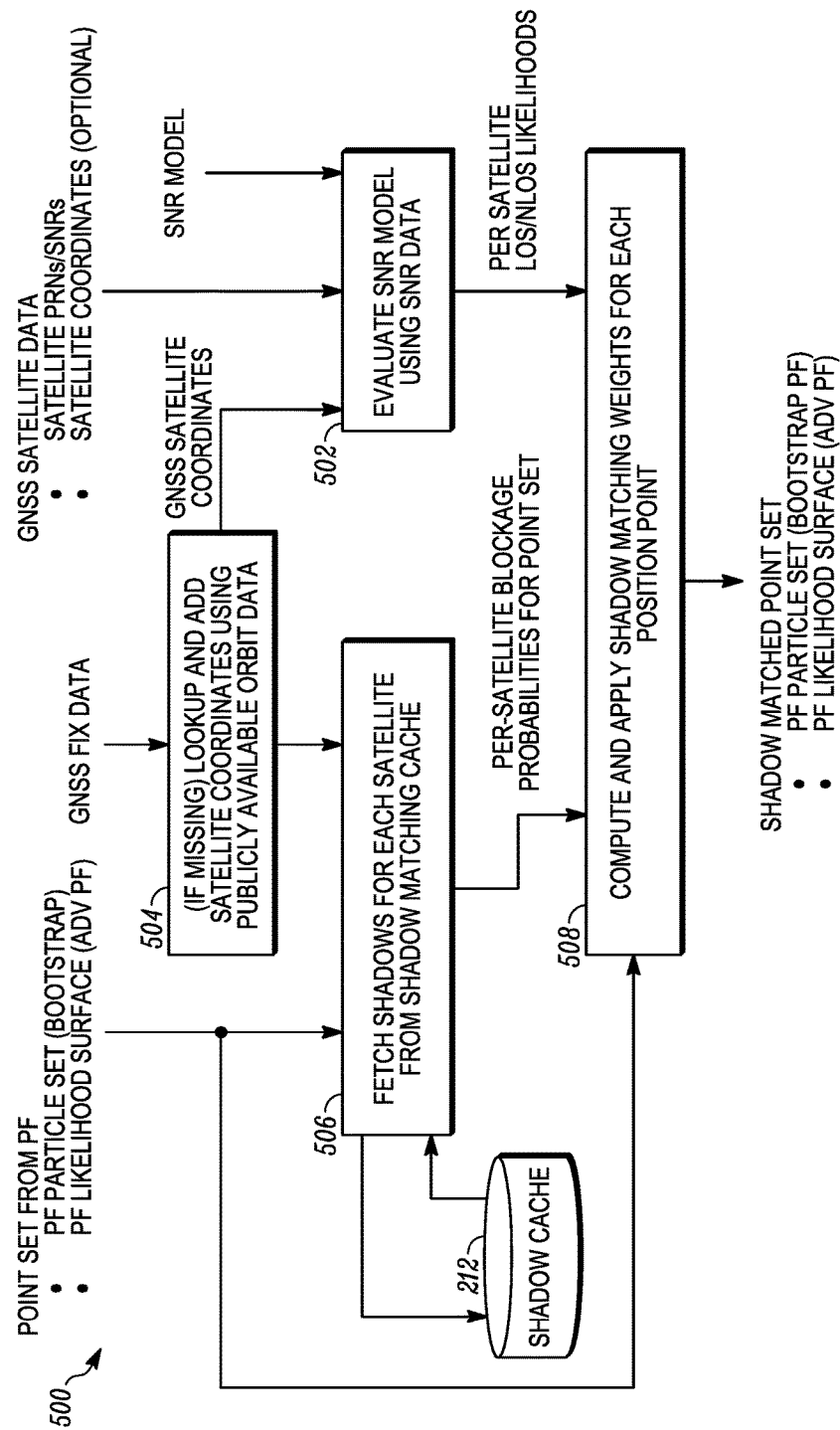
FIG. 5 is a flowchart that illustrates steps performed by the localization server to implement shadow matching according to an embodiment.

FIG. 5 is a flowchart that illustrates steps performed by the localization server to implement a shadow matching model according to an embodiment. Furthermore, it will be appreciated that the steps of method 500 can be performed in any suitable manner that achieves its function.

As discussed above, shadow matching utilizes GNSS and SNR measurements to update particle weights. In particular, shadow matching determines the probability of a signal being a LOS signal or a NLOS signal based on the observed/measured SNR of the each received satellite signal, and determines the probability or likelihood of a satellite signal being blocked based on the location of the particle and the satellite using a 3D reconstruction or map of the user's environment. As discussed above, in some embodiments this includes determining whether a relatively high SNR value in a location expected to be blocked represents a first order reflection that can be taken into account when weighting particles. In addition, FIG. 5 provides some less computationally expensive alternatives. For example, the ray tracing required to determine the probability of a satellite signal being blocked requires a ray to be generated for each particle-satellite pair, which can result in thousands of rays having to be drawn and analyzed to determine the blockage probability. This is computationally expensive. In the embodiment shown in FIG. 5, rather than compute ray traces for each particle location and each satellite, a shadow matching cache 212 (shown in FIG. 2) is maintained based on satellite ephemeris data. In this way, rather than ray trace, a lookup in shadow matching cache 212 provides blockage probabilities for the point set. Having determined the LOS/NLOS likelihoods and the blockage probabilities, these values can be utilized to calculate and update weights describing the likelihood of a particle being located at a particle location based on observed measurements (e.g., GNSS and SNR data). The techniques described with respect to FIG. 5 may be utilized in both the bootstrap PF (shown in FIG. 3) and the advanced PF (shown in FIG. 4). In one embodiment, memory manager 214 distributes at least a portion of shadow matching cache 212 to user device 102 to allow user device 102 to implement a local non-linear filter (e.g., bootstrap PF shown in FIG. 3 or advanced PF shown in FIG. 4). In one embodiment, the portion of shadow matching cache 212 selected for distribution to user device 102 is selected based on an initial position estimate provided by user device 102 to localization server 202. In response, memory manager 214 selects/fetches shadow matching data from shadow matching cache 212 that is relevant to user device 102 and distributes the fetched data to user device 102 for local storage (e.g., as part of local shadow matching cache 216 shown in FIG. 2). In one embodiment, the criteria for shadow matching data fetched and provided to user device 102 includes one or more of those satellites visible to user device 102. In other embodiments, the criteria for shadow matching data distributed by memory manager 214 to local shadow matching cache 218 may include a predetermined radius from the initial position estimate provided by user device 102, and/or a predetermined or fixed amount of data (e.g., fixed size cache) geographically relevant to the initial position estimate of the user device. As discussed above, memory manager may be included as part of localization server 202 (e.g., memory manager 214), or may be included as part of user device 102 (e.g., memory manager 216). In other embodiments, both localization server 202 and user device 102 utilize memory managers in conjunction with one another to load the appropriate shadow matching data into shadow matching cache 218.

In the embodiment shown in FIG. 5, a number of inputs are utilized as part of the shadow matching technique, including GNSS satellite data, GNSS fix data, shadow cache, point set data from the particle filter, and an SNR model.

For example, GNSS satellite data is received from user device 102 (shown in FIG. 1) and includes SNR measurements associated with received satellite signals and information regarding the location of the satellite. In one embodiment, GNSS satellite data includes pseudorandom noise (PRN) information that identifies particular satellites. In other embodiments, the GNSS satellite data includes coordinates indicating the location of the satellite. GNSS fix data includes position estimates generated by the user device 102 based on the received GNSS signals (but without the benefit of particle filtering). GNSS fix data may include latitude/longitude information, along with the typical fix error and a timestamp identifying when the position fix was captured. Shadow matching cache 212 (also shown in FIG. 2) is a collection of data indicating the blockage probability for a set of a satellites and a set of possible points (e.g., user locations). The shadow matching cache data may be generated—at an earlier time—via ray tracing from the plurality of points to each of the satellites based on a 3D map of the area. Point set data may include the PF point set generated by the bootstrap PF (shown in FIG. 3), or the PF likelihood surface generated by the advanced PF (shown in FIG. 4).

At step 502, the SNR model is evaluated using measured SNR data (as well as optionally, satellite coordinates). In general, evaluating the SNR model includes determining on a satellite-per-satellite basis the probability of whether the received signal is LOS or NLOS based on the relative strength or magnitude (e.g., the SNR) of the received GNSS signal. For example, the probability of a signal being LOS is higher when the SNR is high, and lower when the SNR is low. Various distributions may be utilized to model this probability. The Rician distribution has been found to perform well in determining the probability of an SNR signal being LOS. For determining the probability of a signal being NLOS, it has been found that a lognormal distribution performs well. The terms $f_{los}(\cdot)$ and $f_{nlos}(\cdot)$ represent the LOS and NLOS satellite likelihoods, provided on a per satellite basis.

At step 504, satellite coordinates are determined if not already provided as part of the received GNSS satellite data. For example, in embodiments in which the GNSS satellite data includes only PRN identification information, then at step 504 the PRN data is utilized to lookup satellite coordinates/locations based on publicly available orbit data. For example, as shown in FIG. 2, the satellite PRN data is provided to a satellite estimate server 204, which looks up the satellite and in response provides satellite coordinate data.

At step 506, for each particle in the particle set being analyzed, shadow cache data is fetched from shadow matching cache 212 (or local shadow matching cache 216 if being computed locally). The fetched shadow cache data indicates the probability of a signal received from each of the plurality of satellites being blocked. In one embodiment, shadow matching cache 212 is created by precomputing the statistics of the blockage state b(x, e) for each position x, for each possible value of satellite ephemeris data e, taking into account the propagation environment (e.g., map m). The blockage state b(x, e) is defined by two components, the number of blockage states provided and the probability mass function of each state. For example, the number of blockage states can be simplified by reducing the number of states down to a minimum of two—blocked state or unblocked state. With only two possible states, the only number that must be stored for each location/ephemeris pair (x, e) is the probability that the signal from satellite at location e to location x is blocked, which represents the probability mass function of each state. This example could be simplified even further by making the blockage state deterministic. That is, for a binary state, we could insist that the probability of a state being blocked or unblocked is equal to either 0 or 1 (i.e., P[b(x,e)=1] is either true, or not true). In this example, a binary map as a function of location x is provided for each possible satellite ephemeris e. A benefit of this approach is that it reduced the complexity and storage requirements to the point that a mobile device may have sufficient storage for maintaining the shadow cache for a given region. In some embodiments, this may allow for the migration of algorithms from a cloud-based system (e.g., using localization server) to the mobile device itself. For example the mobile device may download 2D shadow projections corresponding to relevant satellite ephemeris information (e.g., satellites currently in view) with updates only needed when satellites move substantially or the user moves substantially. In addition, the shade cache updates uploaded to the mobile device may be further limited by the geographic location of the mobile device.

In other embodiments, the complexity may be increased by modifying the components of the blockage state b(x, e). For example, rather than only two states (blocked or unblocked), additional quantized states may be added indicating the degree to which a location is blocked or unblocked. In addition, the probability mass function can be made probabilistic, rather than deterministic. In one embodiment, only two blockage states are utilized, but a probability is calculated with respect to the blockage state. A benefit of this approach, is that the only number that must be stored is the probability state can be defined as the probability of the location/ephemeris pair (x, e) being blocked (i.e., P[b(x,e)= 1]). In embodiments in which the blockage state is quantized more finely, then the blockage state must be stored along with the probability mass function associated with the blockage state. In addition, both the location of the particle x and the location of the satellite e may be quantized. For example, complexity may be reduced—albeit via decreased accuracy—by increasing the size of quantified locations x, or the satellite ephemeris e.

At step 508, the ray blockage probabilities and the LOS/NLOS likelihoods are utilized to compute and apply shadow matching weights for each position point. In the probabilistic PF framework, at time t given a set of particles $\{x_t^{(k)}\}_k$ and satellite SNR measurements $z_t = [z_{t,1}, \ldots, z_{t,N}]^T$, shadow matching is provided by computing likelihoods of the form $$p(z_t \mid x_t^{(k)}) = \prod_{n=1}^{N_t} p(z_{t,n} \mid x_t^{(k)}) \qquad (28)$$

$$\propto \prod_{n=1}^{N_t} \left[ 1 + \left( \frac{f_{nlos}(z_{t,n})}{f_{los}(z_{t,n})} - 1 \right) P_{t,n,k} \right]$$

where the terms $f_{los}(\cdot)$ and $f_{nlos}(\cdot)$ represent the LOS and NLOS satellite likelihoods based on SNR and $P_{t,n,k}$ is the blockage probability of the ray to the nth satellite from particle $x_t^{(k)}$. The calculated conditional probability for each particle location $x_t^{(k)}$ represents a weight that is then applied to the point set from the PF (e.g., PF particle set or the PF likelihood surface). The result is a shadow matched point set provided as an output at step 510. As discussed above the shadow matched point set may be utilized in conjunction with the bootstrap PF or the advanced PF.

Figure 6:
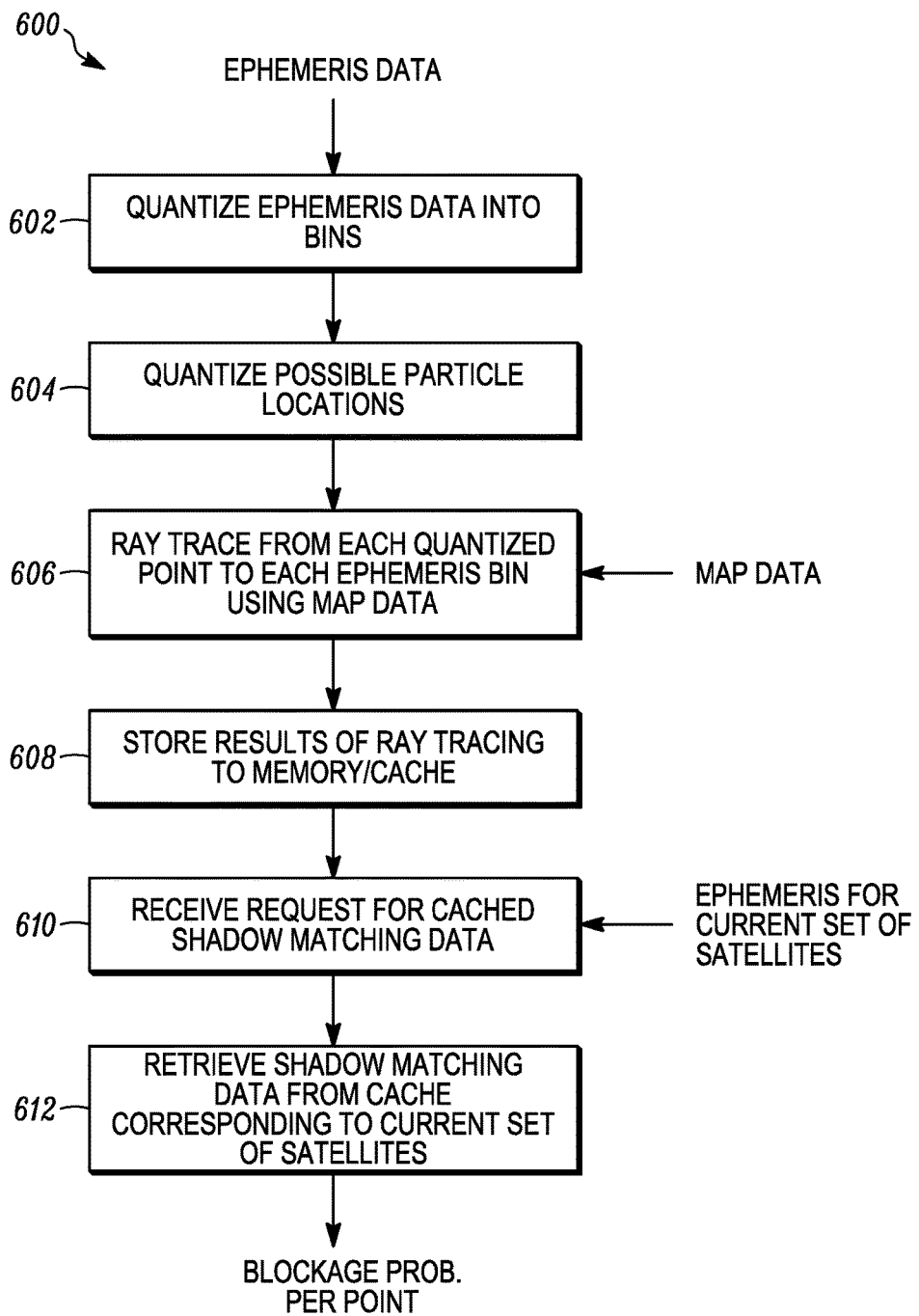
FIG. 6 is a flowchart that illustrates steps performed to create the cached shadow matching data and respond to request for cached shadow matching data according to an embodiment.
Figure 7:
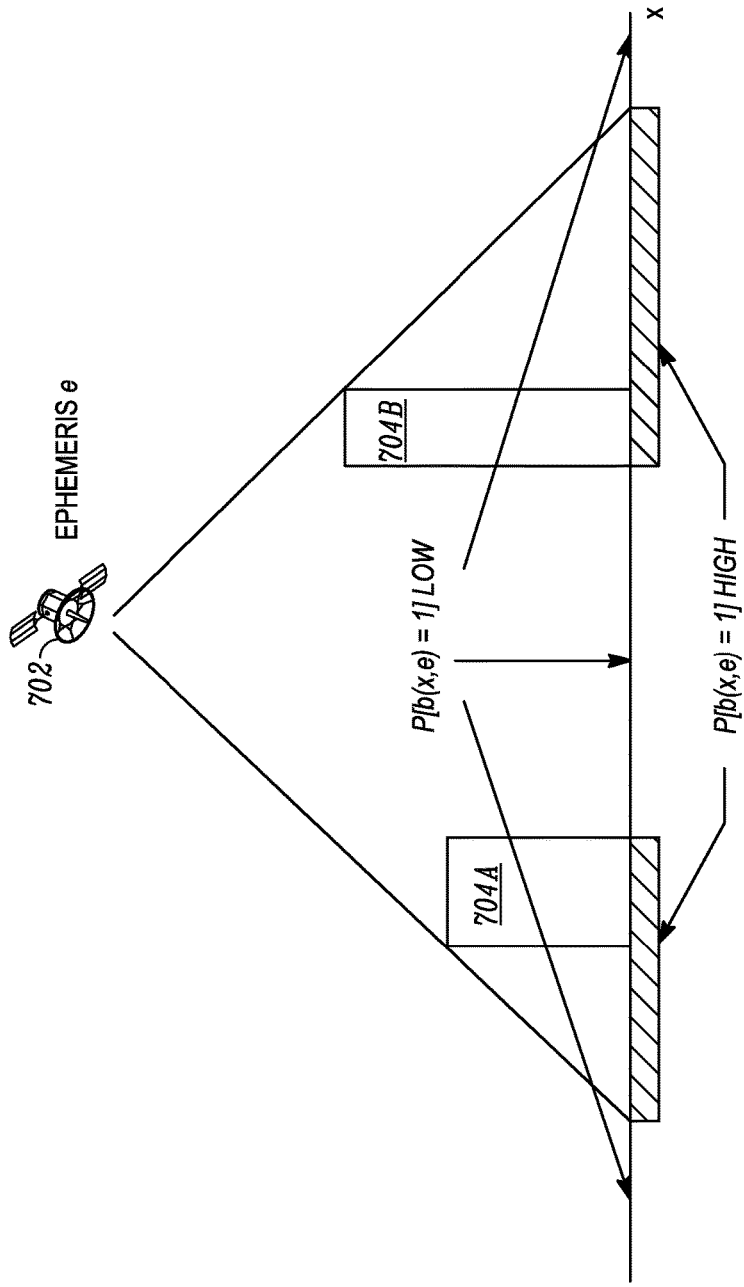
FIG. 7 is a schematic diagram illustrating visually the calculation of cached shadow matching data according to an embodiment.

FIG. 6 is a flowchart that illustrates steps performed to create the cached shadow matching data and respond to request for cached shadow matching data according to an embodiment, with reference to the schematic diagram shown in FIG. 7 to illustrate calculation of cached shadow data. Generation of shadow matching data utilizes map data, including 3D and/or 2D map data, as well as quantized satellite ephemeris data organized into bins. Each satellite moves throughout the day as part of its orbit, and will therefore will having a changing ephemeris based on the time of day. Although the actual satellite ephemeris is constantly changing, these locations can be quantized for purposes of storage in the shadow cache. The granularity of the quantization selected is based on the accuracy require (and the amount of memory/space available for storage of shadow matching data. In this embodiment, each bin represents a quantized satellite ephemeris.

At step 602, ephemeris data is quantized into bins. The granularity associated with the quantized values determines, at least in part, the size of the shadow matching cache. Higher levels of granularity increases the accuracy of the shadow matching data provided, but at the expense of greater memory requirements for storing shadow matching cache. Similarly, at step 604 possible particle locations are quantized, wherein the level of granularity associated with the quantized location values determines, at least in part, the size of the shadow matching cache. Quantized particle locations may be quantized at the same granularity as those particles operated on by the particle filter, or may be quantized at a larger level or granularity. For example, if a particle included as part of a point set represents a granularity of one square foot, the possible particle locations may be quantized at this same level of granularity or may be quantized at a higher level of granularity (e.g., three square feet). With a higher level of granularity, fewer ray tracing calculations are required, and the size of the shadow cache is reduced. However, higher levels of granularity result in less accuracy in the resulting cached shadow data.

At step 606, ray tracing is calculated from each possible quantized particle location to the plurality of quantized satellite ephemeris bins based on 3D/2D map information associated with the environment. The ray tracing utilized at step 606 results in the generation of a signal blocking probability associated with each location/ephemeris bin pair. As discussed above, ray tracing to determine whether a particle is blocked or in the shadow of a structure requires information regarding the environment, in the form of either a 3D map or a 2D map with assumptions regarding the height of building/structures located in the environment. For example, in the embodiment shown in FIG. 7, locations x are illustrated along the horizontal axis, while a single satellite ephemeris e is provided. In this embodiment, the blockage states b(x, e) are binary (i.e., either blocked or unblocked). If B is the set of all possible blockage states, we compute the probability vector $\{p(b(x, e)=b), b \in B\}$ for each (x, e). This is illustrated graphically in FIG. 7, which illustrates the calculation of blockage states as a function of satellite ephemeris e in a one-dimensional geometry for each position x (i.e., located along the horizontal axis) and binary state b. For example, the probability of a position being blocked—expressed as P[b(x,e)=1]—is low for regions located directly under satellite 702 and outside of the shadow created by buildings 704a and 704b. Conversely, the probability of a position being blocked—expressed as P[b(x,e)=1]—is high for regions located in the shadow of buildings 704a and 704b. The blockage state for each term (x, e) is defined by the number of blockage states and the probability mass function of the state. For example, in the simplest case the number of states is binary, with b=1 for the case in which the path is blocked and b=0 for the case in which the path is unblocked, and the only number required to be stored for each (x, e) is the probability mass function, with the probability of the signal being blocked increasing away from the edge of the shadow and increasing as the position of x approaches from the outside edge of a building.

At step 608 the results of the ray tracing are stored to the shadow cache/memory. In one embodiment, the ray tracing results indicate either blocked (i.e., shadow) or non-blocked state, and are stored as a binary result. In other embodiments, the ray tracing results are stored as a probability of blockage. As described above, each shadow bin represents the probability of blockage from all possible quantized particle locations to that particular satellite ephemeris.

At step 610, a request is received for cached shadow matching data. In one embodiment, the request includes ephemeris data for the current set of visible satellites. The request may be provided by the user device, or may be provided by the localization server. In addition, shadow cache may be stored locally on the user device, or may be stored remotely. In embodiments in which local shadow matching cache 218 is distributed to user device 120 by memory manager 214 (or by memory manager 216), a request may be provided by user device and may include criteria or information that allows memory manager 214 to select a portion of shadow matching cache 212 to distribute to local device 102. As discussed above, criteria may include an initial estimate of the location of user device 102 that is utilized to select geographically relevant data. In other embodiments, criteria may include a list of one or more satellites visible to user device 102. In either case, the ability to retrieve blockage probabilities from the shadow cache rather than calculate blockage probabilities through computationally expensive ray tracing techniques allows user device the option of generating localization estimates locally. For each visible satellite, the ephemeris data is provided to find the corresponding bin, and stored blockage probabilities for each of the plurality of quantized point locations are provided from the shade cache. In this way, no ray tracing is required during operation, just a lookup of the appropriate shadow matching bin and retrieval of the previously calculated blockage probabilities. At step 612, blocking probabilities are retrieved from the shadow cache corresponding to the current set of satellites and provided to the particle filter.

In this way, the present disclosure provides a system and method of improving position estimates of global navigation satellite systems (GNSS). In particular, the present disclosure provides a system and method of caching shadow data. As discussed above, a benefit of this approach is that it simplifies the complexity of the operations performed as it does not requires ray-tracing each particle in the particle set. As a result, in some embodiments the localization operations may be performed on a user's device, with the user either storing the shadow cache locally or requesting data from the cache as required. In addition, the present disclosure provides for utilization of first order reflections in further refining the location of a user. In particular, first order reflections may be utilized to aid in determining the side of the street in which the user is located. While embodiments have been described with reference to an exemplary embodiment(s), it will be understood by those skilled in the art that various changes may be made and equivalents may be substituted for elements thereof without departing from the scope of the description. In addition, many modifications may be made to adapt a particular situation or material to the teachings herein without departing from the essential scope thereof. Therefore, it is intended that the description not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments.

A localization system comprising a shadow matching cache and a non-linear filter. The shadow matching cache stores satellite blocking probabilities describing a probability of a satellite signal being blocked at a plurality of possible locations. The non-linear filter receives as inputs from a user device a position estimate and a measured signal strength data associated with a plurality of satellites utilized to generate an improve position estimate. The non-linear filter utilizes a signal-to-noise ratio (SNR) model to determine the likelihood of a particle being located at a particular position given the observed signal strength from each of the plurality of satellites and satellite blocking probabilities fetched from the shadow matching cache.

The system of the preceding paragraph can optionally include, additionally and/or alternatively any, one or more of the following features, configurations and/or additional components.

The system may further include wherein the shadow matching cache is stored remotely from the user device.

The system may further include wherein the shadow matching cache is stored locally by the user device.

The system may further include wherein the user device implements the non-linear filter locally.

The system may further include wherein the shadow matching cache includes signal blocking probabilities associated only with those satellites likely to be visible by the user device.

The system may further include wherein the shadow matching data is comprised of a plurality of quantized ephemeris bins that represent possible locations of each of the plurality of satellites, wherein each quantized ephemeris bin includes probabilities of the satellite being blocked with respect to each of the plurality of possible locations.

The system may further include wherein the SNR model utilizes first order reflections to further refine the likelihood of a particle being located at a particular position.

The system may further include wherein the measured signal strength is identified as a first-order reflection in response to the measured signal strength exceeding a threshold and in response to the fetched satellite blocking probabilities indicating a high likelihood that the satellite signal between the plurality of possible locations and the satellite are blocked.

In another embodiment, a method of determining location of a user device includes receiving global navigation satellite system (GNSS) fix data that represents GNSS calculated position of the user device. The method further includes receiving signal strength data associated with each satellite communicating with the user device and receiving satellite data regarding locations of satellites. Satellite blocking probabilities are retrieved from a shadow matching cache that describe a probability of a satellite signal being blocked at a plurality of possible locations. A non-linear filter is applied to the GNSS fix data, signal strength data, and shadow matching data to generate an updated position estimate of the user device, wherein the non-linear filter includes, at least in part, an SNR measurement model that assigns weights to each of the plurality of particles representing possible user device locations included in a particle set based on the retrieved satellite blocking probabilities retrieved from the shadow matching cache and the received signal strength data.

The method of the preceding paragraph can optionally include, additionally and/or alternatively any, one or more of the following features, configurations and/or additional components.

The method may further include wherein the shadow matching cache is comprised of a plurality of quantized ephemeris bins that represent possible locations of each of the plurality of satellites, wherein each quantized ephemeris bin includes probabilities of the satellite being blocked with respect to each of the plurality of particles.

The method may further include wherein the SNR model utilizes first order reflections to further refine the likelihood of a particle being located at a particular position.

The method may further include wherein the measured signal strength is identified as a first-order reflection in response to the measured signal strength exceeding a threshold and in response to the fetched satellite blocking probabilities indicating a high likelihood that the satellite signal between the plurality of possible locations and the satellite are blocked.

In another embodiment, a method of determining location of a user device includes receiving global navigation satellite system (GNSS) fix data that represents GNSS calculated position of the user device. The method further includes receiving signal strength data associated with each satellite communicating with the user device and receiving satellite data regarding locations of satellites. A non-linear filter is applied to the GNSS fix data and signal strength data to generate an updated position estimate of the user device, wherein the non-linear filter utilizes a signal-to-noise ratio (SNR) model that assigns weights to each of the plurality of particles representing possible user device locations included in a particle set based on calculated likelihoods of satellite signals being blocked at each of the plurality of particles and the received signal strength data, wherein the SNR model utilizes first order reflections to further refine the likelihood of a particle being located at a particular position.

The method of the preceding paragraph can optionally include, additionally and/or alternatively any, one or more of the following features, configurations and/or additional components.

The method may further include wherein the measured signal strength is identified as a first-order reflection in response to the measured signal strength exceeding a threshold and in response to the fetched satellite blocking probabilities indicating a high likelihood that the satellite signal between the plurality of possible locations and the satellite are blocked.

The invention claimed is:

1. A localization system comprising:
   a memory manager to load data values indicative of a satellite signal being blocked at one or more locations into a cache; and
   a non-linear filter, including one or more processors, to:
      receive from a user device a first position estimate and a signal strength data associated with at least one satellite; and
      generate a second position estimate based on the first position estimate, the signal strength data, and the stored data values indicative of the at least one satellite being blocked at one or more locations;
   wherein the data values indicative of a satellite signal being blocked at one or more locations is comprised of a plurality of quantized ephemeris bins that represent possible locations of each of the plurality of satellites, wherein each quantized ephemeris bin includes probabilities of the satellite being blocked with respect to each of the plurality of possible locations.

2. The localization system of claim 1, wherein the memory manager distributes at least a portion of the data values indicative of a satellite signal being blocked at one or more locations to a local cache maintained locally by the user device.

3. The localization system of claim 2, wherein the cache distributed by the memory manager to the user device includes data values associated only with those satellites likely to be visible by the user device.

4. The localization system of claim 1, wherein the non-linear filter is configured to utilize a signal-to-noise ratio (SNR) model to determine the likelihood of a particle being located at a particular position given the observed signal strength from each of the plurality of satellites and data values indicative of a satellite signal being blocked from the cache.

5. The localization system of claim 4, wherein the user device implements the non-linear filter locally.

6. The localization system of claim 1, wherein the SNR model utilizes first order reflections to further refine the likelihood of a particle being located at a particular position.

7. The localization system of claim 1, wherein the cache is maintained remotely from the user device.

8. A localization system comprising:
a memory manager to load data values indicative of a satellite signal being blocked at one or more locations into a cache; and
a non-linear filter, including one or more processors, to:
receive from a user device a first position estimate and a signal strength data associated with at least one satellite; and
generate a second position estimate based on the first position estimate, the signal strength data, and the stored data values indicative of the at least one satellite being blocked at one or more locations;
wherein the SNR model utilizes first order reflections to further refine the likelihood of a particle being located at a particular position; and
wherein the measured signal strength is identified as a first-order reflection in response to the measured signal strength exceeding a threshold and in response to the data value indicative of a satellite signal being blocked indicating a high likelihood that the satellite signal between the plurality of possible locations and the satellite are blocked.

9. The localization system of claim 1, wherein the memory manager selects the data values to load into the cache based on the first position estimate received from the user device.

10. A method of determining location of a user device, the method comprising:
receiving global navigation satellite system (GNSS) fix data that represents GNSS calculated position of the user device;
receiving signal strength data associated with each satellite communicating with the user device;
receiving satellite data regarding locations of satellites;
retrieving satellite blocking values from a cache that describe a likelihood of a satellite signal being blocked at a plurality of possible locations; and
applying, by one or more processors, a non-linear filter to the GNSS fix data, signal strength data, and satellite blocking values to generate an updated position estimate of the user device;
wherein the cache is comprised of a plurality of quantized ephemeris bins that represent possible locations of each of the plurality of satellites, wherein each quantized ephemeris bin includes probabilities of the satellite being blocked with respect to each of the plurality of particles.

11. The method of claim 10, wherein the non-linear filter includes, at least in part, an SNR measurement model to assign weights to each of the plurality of particles representing possible user device locations included in a particle set based on the retrieved satellite blocking values retrieved from the cache and the received signal strength data.

12. The method of claim 10, wherein the SNR model utilizes first order reflections to further refine the likelihood of a particle being located at a particular position.

13. A method of determining location of a user device, the method comprising:
receiving global navigation satellite system (GNSS) fix data that represents GNSS calculated position of the user device;
receiving signal strength data associated with each satellite communicating with the user device;
receiving satellite data regarding locations of satellites;
retrieving satellite blocking values from a cache that describe a likelihood of a satellite signal being blocked at a plurality of possible locations; and
applying, by one or more processors, a non-linear filter to the GNSS fix data, signal strength data, and satellite blocking values to generate an updated position estimate of the user device;
wherein the SNR model utilizes first order reflections to further refine the likelihood of a particle being located at a particular position; and
wherein the measured signal strength is identified as a first-order reflection in response to the measured signal strength exceeding a threshold and in response to the satellite blocking values indicating a high likelihood that the satellite signal between the plurality of possible locations and the satellite are blocked.

14. A method of determining location of a user device, the method comprising:
receiving global navigation satellite system (GNSS) fix data that represents GNSS calculated position of the user device;
receiving signal strength data associated with each satellite communicating with the user device;
receiving satellite data regarding locations of satellites; and
applying, by one or more processors, a non-linear filter to the GNSS fix data and signal strength data to generate an updated position estimate of the user device, wherein the non-linear filter utilizes a signal-to-noise ratio (SNR) model to assign weights to each of a plurality of particles representing possible user device locations included in a particle set based on calculated likelihoods of satellite signals being blocked at each of the plurality of particles and the received signal strength data, wherein the SNR model utilizes first order reflections to further refine the likelihood of a particle being located at a particular position.

15. The method of claim 14, wherein the measured signal strength is identified as a first-order reflection in response to the measured signal strength exceeding a threshold and in response to satellite blocking values indicating a high likelihood that the satellite signal between the plurality of possible locations and the satellite are blocked.

16. The method of claim 14, wherein the satellite blocking values indicating a likelihood of the satellite signal being blocked is calculated using ray tracing from the location of each particle to each of the plurality of satellites.

17. The method of claim 14, wherein the satellite blocking values are fetched from a cache populated with pre-calculated likelihoods of satellite signals being blocked from a plurality of possible locations.

18. A computer readable medium containing program instructions for determining location of a user device, wherein execution of the program instructions by one or more processors of a computer system causes the one or more processors to carry out the steps of:
receiving global navigation satellite system (GNSS) fix data that represents GNSS calculated position of the user device;
receiving signal strength data associated with each satellite communicating with the user device;
receiving satellite data regarding locations of satellites;
retrieving satellite blocking values from a cache that describe a probability of a satellite signal being blocked at a plurality of possible locations; and
applying, by one or more processors, a non-linear filter to the GNSS fix data, signal strength data, and shadow matching data to generate an updated position estimate of the user device, wherein the cache is comprised of a plurality of quantized ephemeris bins that represent possible locations of each of the plurality of satellites, wherein each quantized ephemeris bin includes probabilities of the satellite being blocked with respect to each of the plurality of particles.

19. The computer readable medium of claim 18, wherein the non-linear filter includes, at least in part, an SNR measurement model to assign weights to each of the plurality of particles representing possible user device locations included in a particle set based on the retrieved satellite blocking values retrieved from the cache and the received signal strength data.

20. The computer readable medium of claim 19, wherein the SNR measurement model utilizes first order reflections to further refine the likelihood of a particle being located at a particular position.

* * * * *